United States Patent
Vassilovski et al.

(10) Patent No.: US 11,659,040 B2
(45) Date of Patent: *May 23, 2023

(54) VEHICLE TO EVERYTHING APPLICATION MESSAGING

(71) Applicant: QUALCOMM Incorporated, San Diego, CA (US)

(72) Inventors: Dan Vassilovski, Del Mar, CA (US); Bala Ramasamy, San Marcos, CA (US); Benjamin Lund, Escondido, CA (US); Soumya Das, San Diego, CA (US); Garrett Shriver, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,938

(22) Filed: Oct. 28, 2022

(65) Prior Publication Data

US 2023/0076462 A1 Mar. 9, 2023

Related U.S. Application Data

(63) Continuation of application No. 17/124,003, filed on Dec. 16, 2020, now Pat. No. 11,522,957.
(Continued)

(51) Int. Cl.
*H04L 67/12* (2022.01)
*H04W 4/40* (2018.01)

(52) U.S. Cl.
CPC .............. *H04L 67/12* (2013.01); *H04W 4/40* (2018.02)

(58) Field of Classification Search
CPC .................................. H04L 67/12; H04W 4/40
See application file for complete search history.

(56) References Cited

U.S. PATENT DOCUMENTS

| 2004/0219933 | A1 | 11/2004 | Faith | |
| 2016/0033289 | A1* | 2/2016 | Tuukkanen | ........ G01C 21/3415 701/537 |

(Continued)

OTHER PUBLICATIONS

International Preliminary Report on Patentability—PCT/US2020/065707, The International Bureau of WIPO—Geneva, Switzerland, dated Jul. 28, 2022.

(Continued)

*Primary Examiner* — Christopher B Robinson
(74) *Attorney, Agent, or Firm* — Thien T. Nguyen

(57) ABSTRACT

A user device and transportation entity, such as a transport vehicle or transport server, perform information exchanges for a transportation service using Device-to-Device (D2D) communications, such as dedicated short-range communication (DSRC), a cellular Vehicle-to-Everything (C-V2X), or a 5G New Radio (NR). The information exchanges, for example, are related to, e.g., logistics and delivery of transportation services. For example, the user device may transmit a transportation request message that includes information elements, such as an identifier, a type of transport device requested, a number of users, requested destination, etc. The transportation entity may transmit a transportation response message accepting or rejecting the request. Additional messages, such as a status request and status of the transportation, as well as messages related to completing the transportation service may be exchanged.

30 Claims, 7 Drawing Sheets

Related U.S. Application Data

(60) Provisional application No. 62/961,154, filed on Jan. 14, 2020.

(56) References Cited

U.S. PATENT DOCUMENTS

| | | | |
|---|---|---|---|
| 2017/0127215 A1 | 5/2017 | Khan | |
| 2017/0191842 A1* | 7/2017 | Magazinik | G01C 21/3438 |
| 2017/0359237 A1 | 12/2017 | Hao et al. | |
| 2018/0092057 A1 | 3/2018 | Yamashita et al. | |
| 2018/0159935 A1* | 6/2018 | Cavalcanti | H04W 4/40 |
| 2018/0189713 A1 | 7/2018 | Matthiesen et al. | |
| 2018/0268710 A1* | 9/2018 | Lubeck | H04W 4/023 |
| 2019/0378055 A1* | 12/2019 | Whitt | G08G 1/0125 |
| 2020/0104963 A1* | 4/2020 | Aich | G01C 21/3438 |
| 2020/0217673 A1* | 7/2020 | Bansal | H04W 4/44 |
| 2021/0218812 A1 | 7/2021 | Vassilovski et al. | |

OTHER PUBLICATIONS

International Search Report and Written Opinion—PCT/US2020/065707—ISA/EPO—dated Mar. 16, 2021.

* cited by examiner

United States Patent 11,659,040 B2

VEHICLE TO EVERYTHING APPLICATION MESSAGING

CROSS-REFERENCE TO RELATED APPLICATIONS

This application is a Continuation of U.S. application Ser. No. 17/124,003, entitled "VEHICLE TO EVERYTHING APPLICATION MESSAGING" and filed on Dec. 16, 2020, which claims the benefit of and priority to U.S. Provisional Application No. 62/961,154, filed Jan. 14, 2020, and entitled "VEHICLE TO EVERYTHING APPLICATION MESSAGING," all of which are assigned to the assignee hereof and is incorporated herein by reference in their entireties.

BACKGROUND

Background Field

The subject matter disclosed herein relates to wireless communications systems, and more particularly to methods and apparatuses for vehicle to everything (V2X) message exchange in a wireless communications system.

Relevant Background

Vehicular communication systems are areas of active interest in the communications industry for providing information useful in transportation. Vehicular communication systems, for example, include nodes, such as roadside units (RSUs) and the vehicles themselves, that wirelessly transmit traffic related information and is being developed as part of intelligent transportation systems (ITS). For example, vehicular communication systems include direct communication systems, such as dedicated short-range communication (DSRC), cellular Vehicle-to-Everything (C-V2X) communication, and even 5G New Radio (NR) communications.

The traffic related information to be communicated in currently contemplated vehicular communication systems is related to safety applications. For example, message exchanges currently contemplated in vehicular communication systems are directed to aspects such as safety warnings, traffic congestions (e.g., automated traffic control), and coordinated or automated vehicle maneuvering.

SUMMARY

A user device and transportation entity, such as a transport vehicle or transport server, perform information exchanges for a transportation service using Device-to-Device (D2D) communications, such as dedicated short-range communication (DSRC), a cellular Vehicle-to-Everything (C-V2X), or a 5G New Radio (NR). The information exchanges, for example, are related to, e.g., logistics and delivery of transportation services. For example, the user device may transmit a transportation request message that includes information elements, such as an identifier, a type of transport device requested, a number of users, requested destination, etc. The transportation entity may transmit a transportation response message accepting or rejecting the request. Additional messages, such as a status request and status of the transportation, as well as messages related to completing the transportation service may be exchanged.

In one implementation, a method of performing information exchange for a transportation service by a user device, includes transmitting a transportation request message to a transportation entity wirelessly, the transportation request message comprises one or more message information elements including an identifier for the user device, and a requested destination; receiving a transportation response message from the transportation entity wirelessly, the transportation response message comprises one or more message information elements including acceptance or rejection of the transportation request message; and transmitting a transportation confirm message to the transportation entity wirelessly in response to the acceptance in the transportation response message, the transportation confirm message comprises one or more message information elements including the identifier for the user device.

In one implementation, a user device configured to perform information exchange for a transportation service, the user device includes a wireless transceiver configured to communicate with a transportation entity wirelessly; at least one memory; and at least one processor coupled to the wireless transceiver and the at least one memory, the at least one processor configured to: transmit a transportation request message to the transportation entity, via the wireless transceiver, the transportation request message comprises one or more message information elements including an identifier for the user device, and a requested destination; receive a transportation response message from the transportation entity, via the wireless transceiver, the transportation response message comprises one or more message information elements including acceptance or rejection of the transportation request message; and transmit a transportation confirm message to the transportation entity, via the wireless transceiver, in response to the acceptance in the transportation response message, the transportation confirm message comprises one or more message information elements including the identifier for the user device.

In one implementation, a user device configured to perform information exchange for a transportation service, includes means for transmitting a transportation request message to a transportation entity wirelessly, the transportation request message comprises one or more message information elements including an identifier for the user device, and a requested destination; means for receiving a transportation response message from the transportation entity wirelessly, the transportation response message comprises one or more message information elements including acceptance or rejection of the transportation request message; and means for transmitting a transportation confirm message to the transportation entity wirelessly in response to the acceptance in the transportation response message, the transportation confirm message comprises one or more message information elements including the identifier for the user device.

In one implementation, a non-transitory storage medium including program code stored thereon, the program code is operable to configure at least one processor in a user device to perform information exchange for a transportation service, includes program code to transmit a transportation request message to a transportation entity wirelessly, the transportation request message comprises one or more message information elements including an identifier for the user device, and a requested destination; program code to receive a transportation response message from the transportation entity wirelessly, the transportation response message comprises one or more message information elements including acceptance or rejection of the transportation request message; and program code to transmit a transportation confirm message to the transportation entity wirelessly in response to the acceptance in the transportation response message, the transportation confirm message comprises one or more message information elements including the identifier for the user device.

In one implementation, a method of performing information exchange for a transportation service by a transportation entity, the method includes receiving a transportation request message from a user device wirelessly, the transportation request message comprises one or more message information elements including an identifier for the user device, and a requested destination; transmitting a transportation response message to the user device wirelessly, the transportation response message comprises one or more message information elements including an acceptance or rejection of the transportation request message; and receiving a transportation confirm message from the user device wirelessly in response to an acceptance in the transportation response message, the transportation confirm message comprises one or more message information elements including the identifier for the user device.

In one implementation, a transportation entity configured to perform information exchange for a transportation service, the transportation entity includes a wireless transceiver configured to communicate with a user device; at least one memory; and at least one processor coupled to the wireless transceiver and the at least one memory, the at least one processor configured to: receive a transportation request message from the user device, via the wireless transceiver, the transportation request message comprises one or more message information elements including an identifier for the user device, and a requested destination; transmit a transportation response message to the user device, via the wireless transceiver, the transportation response message comprises one or more message information elements including an acceptance or rejection of the transportation request message; and receive a transportation confirm message from the user device, via the wireless transceiver, in response to an acceptance in the transportation response message, the transportation confirm message comprises one or more message information elements including the identifier for the user device.

In one implementation, a transportation entity configured to perform information exchange for a transportation service, the transportation entity includes means for receiving a transportation request message from a user device wirelessly, the transportation request message comprises one or more message information elements including an identifier for the user device, and a requested destination; means for transmitting a transportation response message to the user device wirelessly, the transportation response message comprises one or more message information elements including an acceptance or rejection of the transportation request message; and means for receiving a transportation confirm message from the user device wirelessly in response to an acceptance in the transportation response message, the transportation confirm message comprises one or more message information elements including the identifier for the user device.

In one implementation, a non-transitory storage medium including program code stored thereon, the program code is operable to configure at least one processor in a transportation entity to perform information exchange for a transportation service, the non-transitory storage medium including includes program code to receive a transportation request message from a user device wirelessly, the transportation request message comprises one or more message information elements including an identifier for the user device, and a requested destination; program code to transmit a transportation response message to the user device wirelessly, the transportation response message comprises one or more message information elements including an acceptance or rejection of the transportation request message; and program code to receive a transportation confirm message from the user device wirelessly in response to an acceptance in the transportation response message, the transportation confirm message comprises one or more message information elements including the identifier for the user device.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Vehicular communication systems, such as Vehicle to Everything (V2X), may be used, for example, for safety related applications, such as safety warnings, traffic congestions (e.g., automated traffic control), and coordinated or automated vehicle maneuvering. Application layer messages and information elements (IEs) to support safety related applications are being defined by various standards development organizations. For example, Society of Automotive Engineers (SAE) is preparing work item J3186 Maneuver Sharing and Coordinating Service and J2945/6 Performance Requirements for Cooperative Adaptive Cruise Control and Platooning. In China, Baidu has initiated a Phase 3 message definition effort for coordinated driving. Such messages are prerequisites for intelligent transportation systems (ITS), for example, for coordinated or automated vehicle maneuvering and traffic control.

As discussed herein, vehicular communication systems additionally may be used for non-safety applications. Non-safety applications may solve numerous use case issues, for example, for transport vehicles (e.g., train, bus, rideshare, etc.) and user device interactions with transport vehicles (e.g., logistics, delivery, etc.). Vehicular communication systems, e.g., direct wireless communications between V2X entities, may be used to engage (e.g., request, confirm, obtain status, etc.) transportation for a consumer or a service. For example, a user, e.g., a consumer, may use vehicular communication systems to request or otherwise communicate with a transport vehicle or transport service to be used as transportation for the user. In another example, a user, e.g., an entity or service, may use vehicular communication systems to request or otherwise communicate with a transport vehicle or transport service to be used as delivery transportation for goods or services, such as freight, food delivery, etc.

In one implementation, a set of application-layer IEs delineate transport vehicle and user device interactions, such as transportation requests or registration, status, and transportation completion or deregistration. Transportation related messages may be, e.g., dedicated messages in Device-to-Device (D2D) communication link, such as dedicated short-range communication (DSRC), cellular Vehicle-to-Everything (C-V2X) communication, 5G New Radio (NR) communication such as 5G NR-based sidelink communication, or similar wireless communication systems.

Figure 1:
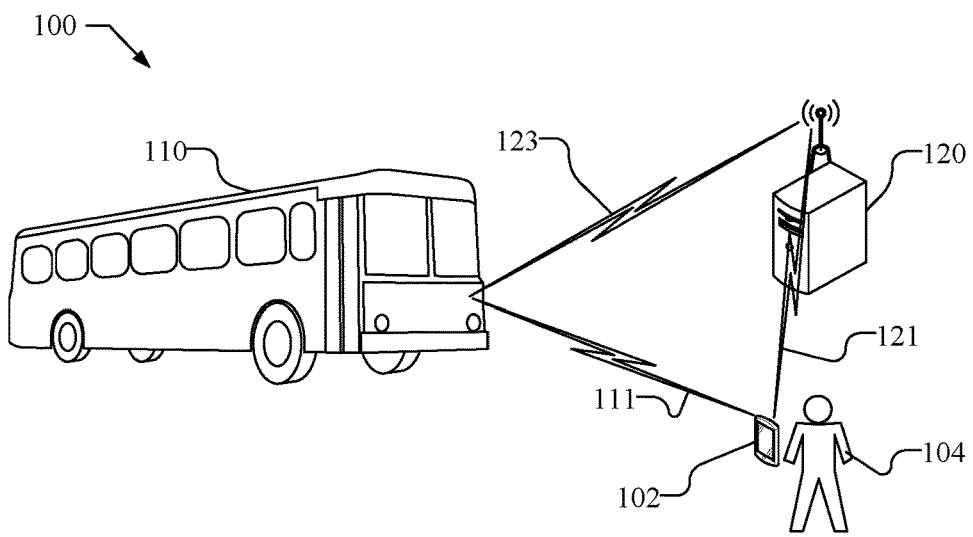
FIG. 1 illustrates a wireless communication system in which a user device is in wireless communications with a transportation entity.

FIG. 1 illustrates a V2X wireless communication system 100 in which V2X services operate using direct wireless communications between the V2X entities. As illustrated, a user device 102 associated with user 104 may directly communicate with various other entities wirelessly, such as a transportation entity, shown as a transport vehicle 110 (illustrated as a bus) via a Vehicle-to-Pedestrian (V2P) communication link 111 or a road side unit (RSU) 120 via a Vehicle-to-Infrastructure (V2I) communication link 121. FIG. 1 illustrates the user 104 as a person who may be a consumer of the transportation, e.g., user 104 may be transported by the transport vehicle 110. In some implementations, however, the user 104 may be an entity, such as a restaurant, store, etc., and the transport vehicle 110 may be used to transport goods or services provided or requested by the user 104.

A roadside unit (RSU) is a stationary infrastructure entity supporting V2X applications that can exchange messages with other entities supporting V2X applications. The user device 102 may be in wireless communication with the transport vehicle 110 via the RSU 120, via V2P communication link 121 and V2I communication link 123. The wireless communication, for example, may be over, e.g., Proximity-based Services (ProSe) Direction Communication (PC5) reference point as defined by the 3rd Generation Partnership Project (3GPP) body of standards, such as in Technical Specification (TS) 23.303, and may use wireless communications under IEEE 1609, Wireless Access in Vehicular Environments (WAVE), Intelligent Transport Systems (ITS), dedicated short range communications (DSRC), cellular Vehicle-to-Everything (C-V2X), and IEEE 802.11p, on the ITS band of 5.9 GHz, or other wireless connections directly between entities. During direct communications with one or more entities in the V2X wireless communication system 100, each entity provides V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases, such as lane changes, speed changes, overtaking speeds, etc. As discussed, herein, the user device 102 and the transportation entity, e.g., transport vehicle 110, may further exchange messages related to transport vehicle and user device interactions, such as logistics, delivery, status, etc.

Figure 2:
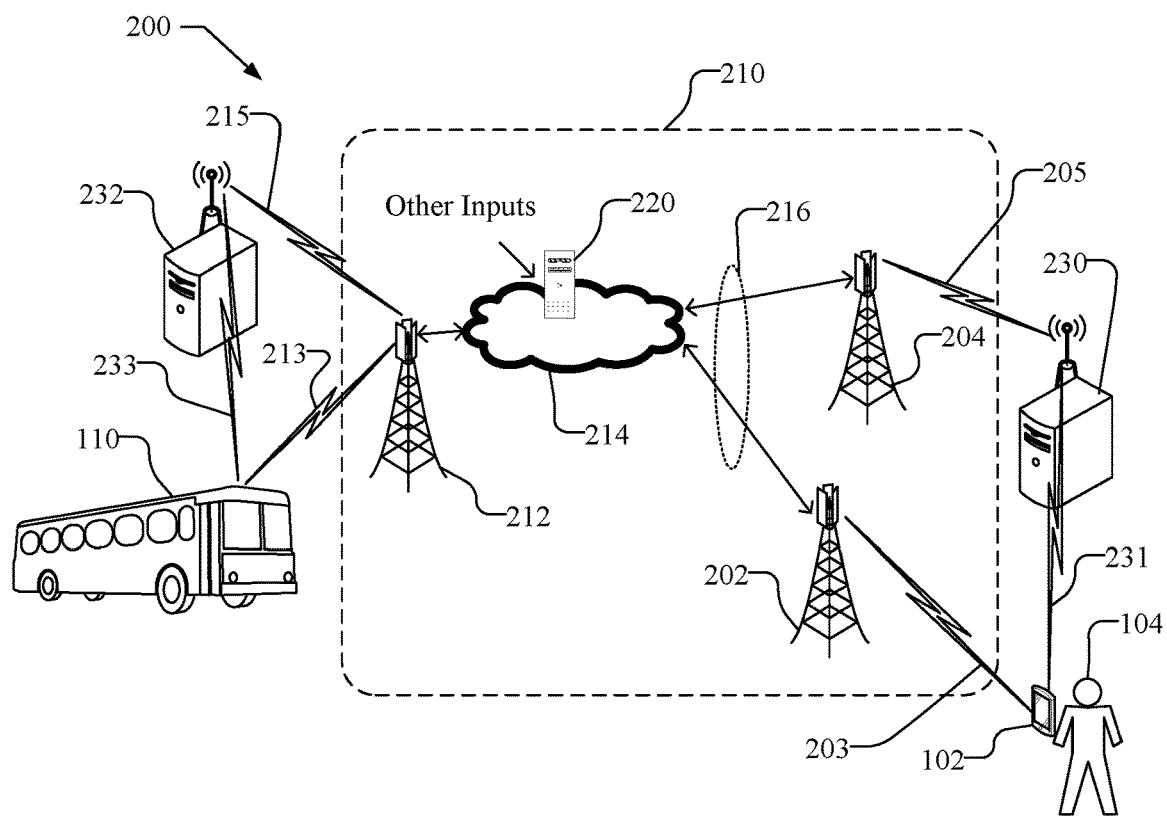
FIG. 2 illustrates another wireless communication system in which a user device is in wireless communications with transportation entities.

FIG. 2 illustrates a Vehicle-to-Network (V2N) wireless communication system 200 in which V2X services operate using a wireless network between entities, such as Wireless Wide Area Networks (WWAN). For example, entities may communicate via the Long Term Evolution (LTE) network, where the radio interface between the user equipment (UE) and the eNodeB is referred to as LTE-Uu, or other appropriate wireless networks, such as "3G," "4G," or "5G" networks. As illustrated, the user device 102 may wirelessly communicate with a transportation entity, such as the transport vehicle 110 or a transport server 220, through the network infrastructure 210, which for the sake of example, will be referred to as a LTE network, but may be a 5G NR network or other type of network. As illustrated, the user device 102 may wirelessly communicate with the network infrastructure 210, e.g., a base station 202, referred to as an eNodeB in the LTE network infrastructure 210 (or a gNodeB in a 5G NR network infrastructure), via a Uu interface 203. As illustrated, in some implementations, the user device 102 may directly communicate with an RSU 230 via communication link 231, which interfaces with a base station 204 via a Uu interface 205.

The base station 202 may communicate with other base stations, e.g., base station 212 through the IP layer 214 and network 216, such as an Evolved Multimedia Broadcast Multicast Services (eMBMS)/Single Cell Point To Multipoint (SC-PTM) network. The transport server 220 may be part of or connected to the IP layer 214, as illustrated, or may be external to the IP layer 214 and the network infrastructure 210. The transport server 220 may receive and route information between the user device 102 and the transport vehicle 110, as well as receive other external inputs. The base station 212 may wirelessly communicate with the transport vehicle 110 directly or through other V2X entities, such as RSU 232 via Uu interfaces 213 or 215 and 233, respectively. The V2N communication using the "Uu" interface may be used to exchange messages using, e.g., C-V2X, 5G NR communications, etc. The information exchange may be similar to that discussed above, including messages related to transport vehicle and user device interactions, such as logistics, delivery, status, etc., but the information exchange is over a greater distance than the direct communications shown in FIG. 1.

Figure 3:
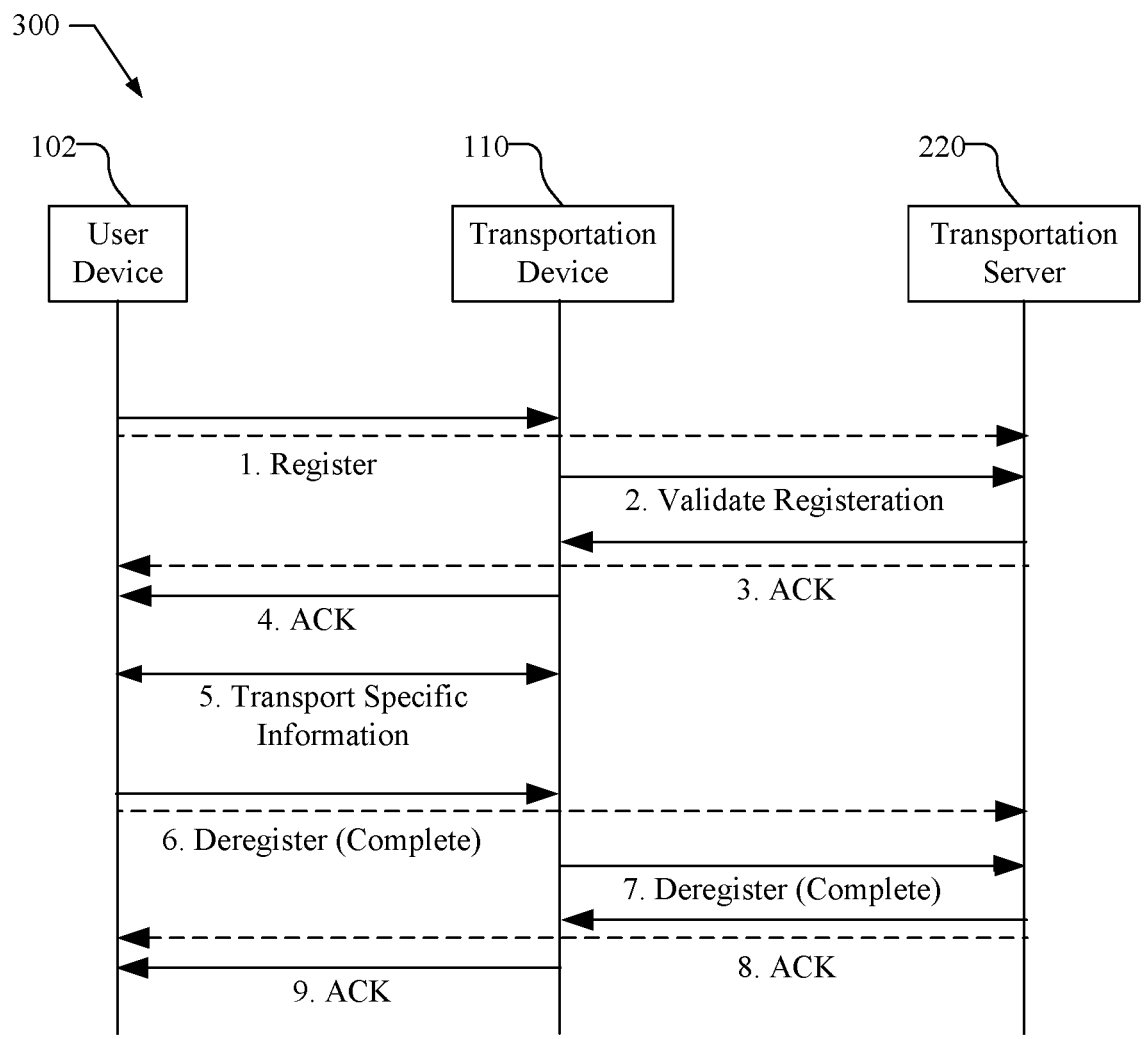
FIG. 3 is a signal flow illustrating an example of message exchange between a user device and one or more transportation entities, such as a transport vehicle and/or transport server, for transportation service operations.

FIG. 3 is a signal flow 300 illustrating an example of message exchange between a user device 102, which may be used by an end user or other entity, such as a restaurant, store, service, etc., and one or more transportation entities, e.g., a transport vehicle 110 and/or transport server 220, for transportation service operations. The transportation services, for example, may be related to public transport, such as city buses, trolleybuses, trams (or light rail) and passenger trains, rapid transit (metro/subway/underground, etc.), ferries, airlines, coaches, and intercity rail. Transportation services may further include paratransit, vehicles for hire (e.g., taxicabs, rickshaws, limousines, party buses etc.), scooter sharing, bicycle sharing, etc. Additionally, the transportation services may be used for delivery transport, e.g., for freight, food, goods, or services. For example, the transportation services may be used by an entity that provides goods or services to an end user (e.g., at the request of the end user). For example, an entity, such as a restaurant, store, delivery service, etc., may request a transport vehicle (delivery device) using a vehicular communication system to deliver goods or services. The entity may be agnostic to the delivery device, but instead may focus on cost and delivery time or other criteria specific to that requestor. In some implementations, a request may be made by an end user and provided to the entity, e.g., a restaurant, store, delivery service, and the entity may request a transport vehicle (delivery device) using a vehicular communication system. The messages may be dedicated messages or encapsulated in the data payload, e.g., in a D2D communication link, such as C-V2X, DSRC, and/or 5G NR communications, such as 5G NR-based sidelink communications.

At stage 1 of FIG. 3, the user device 102 may transmit a transport registration message to the transportation entity, e.g., transport vehicle 110. The transport registration message, for example, may be transmitted directly to the transport vehicle 110. In some implementations, as illustrated by the dotted line, the transportation registration may be transmitted to the transport server 220. The transport registration message, for example, may include an identifier for the user device 102 and an identifier for the transport vehicle. The transport registration message, e.g., may include a payment method to be charged for transport. The transport registration message may be a request for or registration with a transport specific or Original Equipment Manufacturer (OEM) specific. For example, if registering for or requesting a bus, the transportation registration message may indicate the type of bus being requested, e.g., such as a city bus or a cross-country bus. Similarly, if registering for or requesting a train, the transportation registration message may indicate the type of train being requested, e.g., a tram, a local train, or national train. The transportation registration message may provide a registration server address for purchasing tickets or validating transportation pass (e.g., bus pass). The transportation registration message may provide information such as ticket information or destination information. The transportation registration message may include requests for special seating or luggage arrangements (such as bicycle storage), or requests for assistance, such as assistance with entering/exiting the transport vehicle, assistance with luggage, etc. The transportation registration message may provide message specific information, such as a validation period for the transportation registration message. If the transport is requested for delivery of goods or services, the transportation registration message may provide information related to the goods or services, e.g., identification, type, special requirements (e.g., temperature control), as well as other information such as destination, cost and delivery time.

At stage 2, the transport vehicle 110 may send a validate registration message to the transport server 220, e.g., if the user device 102 sent the transportation registration message to the transport vehicle 110. The validate registration message may be used by the transport vehicle 110 to validate the registration of the user device 102 with the transport vehicle 110, e.g., to confirm that the user device 102 has purchased a ticket or has a valid account for the transportation request, or, alternatively, to initiate the registration of the user device with the transportation vehicle or service.

At stage 3, the transport server 220 may send an acknowledgement for the transportation registration message to the transport vehicle 110 or the user device 102, e.g., if message from stage 1 was transmitted to the transport server 220.

At stage 4, the transport vehicle 110 may send an acknowledgement for the transportation registration message to the user device 102.

The acknowledgement message from stage 3 and/or stage 4, e.g., may provide information such as an indication to the user device 102 where there are available seats or assigned seats, an indication of the estimated time to a user specific stop and/or next stop, route information, or certification information, e.g., so that encrypted information broadcast by the transport vehicle 110 may be decrypted by the user device 102.

At stage 5, the user device 102 and the transport vehicle 110 may exchange transport specific information. The transport specific information may be exchanged directly, e.g., upon request, or may be broadcast, e.g., upon request or periodically broadcast. In some implementations, the transport specific information, whether sent directly to user device 102 or broadcast, may be encrypted, and the user device 102 may decrypt the messages using certification information received, e.g., in an acknowledgement message from stages 3 and/or 4. The transport specific information may be case specific, by way of example, for a bus or train the transport specific information may include route information, upcoming stops, or a periodic indication of the current location. Other examples of transport specific information may include available battery, available range, or potential parking areas within a specific area for an electric scooter or bicycle, or include a route, location or stop information for ride sharing applications. In the transport specific information, the user may request updates, such as a status update, or an update to an itinerary, such as a change in destination, or a pass renewal, etc.

At stage 6, the user device 102 may send a deregistration (complete) message to the transport vehicle 110, or as indicated by the dotted line, to the transport server 220. The deregistration message may be used, for example, to indicate that the user would like to exit at a particular stop or an upcoming stop. The deregistration message may also be used to compete a purchase at a destination, e.g., by charging the payment method provided during registration based on user device's ride.

At stage 7, the transport vehicle 110 may send a deregistration (complete) message to the transport server 220, e.g., if the user device 102 sent the deregistration message to the transport vehicle 110.

At stages 8 and 9, acknowledgment messages for the deregistration message may be sent to the transport vehicle 110 and/or the user device 10. The transport vehicle 110 or the transport server, for example, may request as part of the deregistration process that the user device 102 provide periodic signals to the transport vehicle 110, with which the transport vehicle 110 or the transport server 220 may validate that the user device 102 has exited the transport vehicle 110 at the appropriate stop, e.g., based on a change in the signal strength as the user device 102 exits the transport vehicle 110 and the transport vehicle 110 departs and the distance between the user device 102 and the transport vehicle 110 increases.

Figure 4:
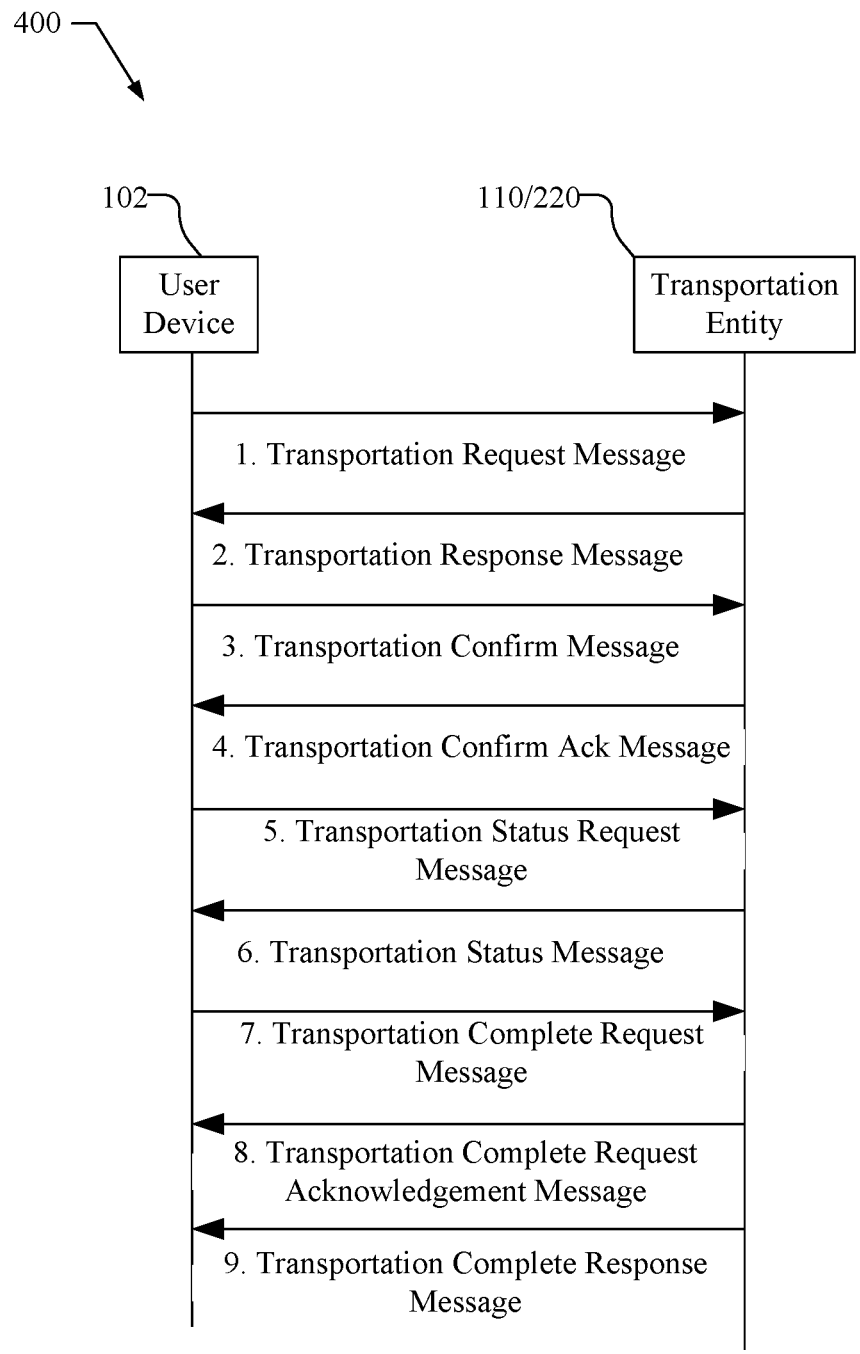
FIG. 4 is a signal flow illustrating another example of message exchange between a user device and one or more transportation entities, such as a transport vehicle and/or transport server, for transportation service operations.

FIG. 4 is a signal flow 400 illustrating another example of message exchange between a user device 102 and a transportation entity, which may be, e.g., transport vehicle 110 and/or transport server 220. The messages exchanged may be dedicated messages or encapsulated (e.g., via a Radio Resource Control (RRC) message or similar messages).

At stage 1 of FIG. 4, the user device 102 may transmit a transportation request message to the transportation entity 110/220. The transportation request message may be issued by a user 104 (shown in FIGS. 1 and 2) through the user device 102 to request transportation. The transportation request message may include particulars for the transportation, such as a user device identifier (e.g., an octet random identifier to identify the requestor and ensure anonymity), the transportation type requested (e.g., bus, train, subway, rideshare, etc.), the destination (e.g., selected from a map or address), number of users (e.g., number in user's party), user type (e.g., pedestrian, cyclist, scooter, wheelchair, stroller, other), validity or expiration of transportation request (e.g., providing an indication of how long the user is willing to wait), a maximum the user is will to pay, identification of goods or services to be transported, special requirements (e.g., temperature control), etc. Table 1, by way of example, illustrates data fields, data elements, and contents thereof that all or some of which may be included in a transportation request message. Additionally, Table 1 provides suggestions of which data fields or data elements may be considered mandatory (M) or optional (O) in a transportation request message.

TABLE 1

| Data Field (DF) Data Element (DE) | Data Element (DE) | Contents (DF, DE) | Mandatory/ Optional |
|---|---|---|---|
| TemporaryID | 4 octet random device identifier to identify requestor and ensure anonymity | DE_TemporaryID ::= OCTET STRING (SIZE(4)) | M |
| Public-Transportation-Type | bus, train, subway, rideshare, other (user-entered) | May include: DE_VehicleType (bus, passenger car) DE_BasicVehicleClass (ExpressBus, LocalBus, SchoolBus, Ambulance) | M |
| Numberof-RequestingUsers | Integer count (user-entered) | DE_Count Count ::= INTEGER (0 .32) | M |
| RequestingUser-Type | pedestrian, cyclist, scooter, wheelchair, stroller, other Æ Number of instances = Number of RequestingUsers | DF_RequestorType: otherTraveler-Pedestrian, otherTraveler-Visually-Disabled, otherTraveler-Physically-Disabled, otherTraveler-Bicycle | M |
| User/rider destination | User-entered destination. • User-specified by selection on map • User-specified by address entry • Application converts to (latitude, longitude) | DE_Latitude DE_Longitude | M |
| Willingness to share | Yes/No (This DE could be displayed conditionally to the user depending on type of public transit requested) | WillingToShare ::= BOOLEAN | O |
| Validity time/ Expiration for request | Duration in hours, minutes (indicate how long requester willing to wait) | DE_Duration | M |
| Maximum travel time or must destination arrival time | Date, Time (Lets back-end server recommend specific transportation type, and/or inform rider the type chosen will not work) | DF_DDateTime | M |

TABLE 1-continued

| Data Field (DF) Data Element (DE) | Data Element (DE) | Contents (DF, DE) | Mandatory/ Optional |
|---|---|---|---|
| Maximum fare willing to pay | (This DE could be displayed conditionally to the user depending on type of public transit requested) | Currency | O |
| Requested-DepartureTime | This could be for delayed requests or trips that are planned in the future | | O |
| Beacon-Proximity-Threshold | This could be used for rideshare applications of when the vehicle or user should start initiating a sidelink beacon. | Distance Threshold Time Threshold | O |

At stage 2 of FIG. 4, the transportation entity 110/220 may transmit a transportation response message to the user device 102. The transportation response message may be transmitted from the transport vehicle 110 or from a central service, e.g., transport server 220, to accept or reject the transportation request message transmitted in stage 1. In some implementations, the transportation response message may be from the transport server 220 and may be encapsulated (e.g., via RRC message and provided to the transport vehicle 110 for the transport vehicle 110 to make a determination of whether to accept or reject the transportation request. The transportation response message may include information, such as the transportation response type (e.g., accept or reject), transportation type, transportation identifier, fare, shared, estimated time of arrival (ETA) to pick up, and ETA to destination. Table 2, by way of example, illustrates data fields, data elements, and contents thereof that all or some of which may be included in a transportation response message. Additionally, Table 2 provides suggestions of which data fields or data elements may be considered mandatory (M) or optional (O) in a transportation response message.

TABLE 2

| Data Field (DF) Data Element (DE) | Data Element (DE) | Contents (DF, DE) | Mandatory/ Optional |
|---|---|---|---|
| ResponseType | Bit mapped to values: • Accept • Reject • Status | DE_ResponseType ::= ENUMERATED { Accept (0), Reject (1), Status (2), } -- Encoded as 3-bit value | M |
| Transportation-Type | bus, train, rideshare, other | May include: DE_VehicleType (bus, passenger car) DE_BasicVehicleClass (ExpressBus, LocalBus, SchoolBus, Ambulance) | O |

TABLE 2-continued

| Data Field (DF) Data Element (DE) | Data Element (DE) | Contents (DF, DE) | Mandatory/ Optional |
|---|---|---|---|
| Transportation- Identity | License plate, Bus number, Train Number | DF_TransportIdentity: DE_LicensePlate ::= OCTET STRING (SIZE(4)) Optional DE_BusNumber ::= OCTET STRING (SIZE(4)) Optional DE_TrainNumber ::= OCTET STRING (SIZE(4)) Optional | O |
| Fare Shared/Individual | Toll/Fare Optionally included depending on transport type (e.g., ride-share vs. bus/train) | Currency Shared ::= BOOLEAN | O O |
| ETA_Pickup | Time until pickup | DF_Duration | O |
| ETA_Destination | Estimated time of arrival to destination | DF_DDateTime | O |

At stage 3 of FIG. 4, the user device 102 may transmit a transportation confirm message to the transportation entity 110/220. The transportation confirm message may be issued by a user 104 (shown in FIGS. 1 and 2) through the user device 102 to accept the offered transportation, such as the fare, etc. Table 3, by way of example, illustrates data fields, data elements, and contents thereof that all or some of which may be included in a transportation confirm message. Additionally, Table 3 provides suggestions of which data fields or data elements may be considered mandatory (M) or optional (O) in a transportation confirm message.

TABLE 3

| Data Field (DF) Data Element (DE) | Data Element (DE) | Contents (DF, DE) | Mandatory/ Optional |
|---|---|---|---|
| TemporaryID | 4 octet random device identifier to identify requestor and ensure anonymity | DE_TemporaryID ::= OCTET STRING (SIZE(4)) | M |
| User/rider destination | User-entered destination. • User-specified by selection on map • User-specified by address entry • Application converts to (latitude, longitude) | DE_Latitude DE_Longitude | M |
| ETA_Pickup | Time until pickup | DF_Duration | M |

At stage 4 of FIG. 4, the transportation entity 110/220 may transmit a transportation confirm acknowledgment message to the user device 102. The transportation confirm acknowledgement message may be used to acknowledge the transportation confirmation and to, e.g., confirm pick up ETA, travel ETA, fare, etc.

At stage 5 of FIG. 4, the user device 102 may transmit a transportation status request message to the transportation entity 110/220. The transportation status request message may include the user device identifier and may request the status of transportation service, such as the information related to a current location (such as a current stop, time to next stops, etc.) or information related to an estimate of arrival to the requested destination, such as an ETA to destination, number of stops to destination, etc. Table 4, by way of example, illustrates data fields, data elements, and contents thereof that all or some of which may be included in a transportation status request message. Additionally, Table 4 provides suggestions of which data fields or data elements may be considered mandatory (M) or optional (O) in a transportation status request message.

TABLE 4

| Data Field (DF) Data Element (DE) | Data Element (DE) | Contents (DF, DE) | Mandatory/ Optional |
|---|---|---|---|
| TemporaryID | 4 octet random device identifier to identify requestor and ensure anonymity | DE_TemporaryID ::= OCTET STRING (SIZE(4)) | M |
| User/rider destination | User-entered destination. • User-specified by selection on map • User-specified by address entry • Application converts to (latitude, longitude) | DE_Latitude DE_Longitude | M |

At stage 6 of FIG. 4, the transportation entity 110/220 may transmit a transportation status message to the user device 102 in response to the transportation status request message. The transportation status message, for example, may be used to indicate the requested status of the transportation service, e.g., information related to a current location, or information related to an estimate of arrival to the requested destination, such as ETA to destination, number of stops to destination, etc. In some implementations, the user device 102 may determine an estimate of arrival to the requested destination based on information related to the current location provided in the status message. For example, the status message may provide the current stop for a bus and the time between upcoming stops. The user device 102 may determine, based on the requested destination and known route and the status message, the time to the destination or number of stops to the destination. It should be understood that multiple transportation status request and transportation status messages may be exchanged between the user device 102 and the transportation entity 110/220. Table 5, by way of example, illustrates data fields, data elements, and contents thereof that all or some of which may be included in a transportation status message. Additionally, Table 5 provides suggestions of which data fields or data elements may be considered mandatory (M) or optional (O) in a transportation status message.

TABLE 5

| Data Field (DF) Data Element (DE) | Data Element (DE) | Contents (DF, DE) | Mandatory/ Optional |
|---|---|---|---|
| ETA_ Destination | • Estimated time of arrival to destination • Estimated number of stops to destination | DF_DDateTime DE_Count Count ::= INTEGER (0 . . . 32) | M |

TABLE 5-continued

| Data Field (DF) Data Element (DE) | Data Element (DE) | Contents (DF, DE) | Mandatory/ Optional |
|---|---|---|---|
| Destination Location | Physical address mapped to latitude and longitude | DE_Latitude DE_Longitude | O |

At stage 7 of FIG. 4, the user device 102 may transmit a transportation complete request message to the transportation entity 110/220. The transportation complete request message may request that the user device 102 be permitted to disembark from the transport vehicle 110, e.g., at the next stop, and that the transportation services terminate. Table 6, by way of example, illustrates data fields, data elements, and contents thereof that all or some of which may be included in a transportation complete request message. Additionally, Table 6 provides suggestions of which data fields or data elements may be considered mandatory (M) or optional (O) in a transportation complete request message.

TABLE 6

| Data Field (DF) Data Element (DE) | Data Element (DE) | Contents (DF, DE) | Mandatory/ Optional |
|---|---|---|---|
| TemporaryID | 4 octet random device identifier to identify requestor and ensure anonymity | DE_TemporaryID ::= OCTET STRING (SIZE(4)) | M |
| DisembarkRequest | DE_Disembark | Disembark ::= BOOLEAN | M |

At stage 8 of FIG. 4, the transportation entity 110/220 may transmit a transportation complete request acknowledgment message to the user device 102 in response to and to acknowledge the transportation complete request message. Table 7, by way of example, illustrates data fields, data elements, and contents thereof that all or some of which may be included in a transportation complete request acknowledgment message. Additionally, Table 7 provides suggestions of which data fields or data elements may be considered mandatory (M) or optional (O) in a transportation complete request acknowledgment message.

TABLE 7

| Data Field (DF) Data Element (DE) | Data Element (DE) | Contents (DF, DE) | Mandatory/ Optional |
|---|---|---|---|
| ETA_Destination | • Estimated time of arrival to destination <br> • Estimated number of stops to destination | DF_DDateTime DE_Count Count ::= INTEGER (0 . . . 32) | M |
| DisembarkRequest | DE_Disembark | Disembark ::= BOOLEAN | M |

At stage 9 of FIG. 4, the transportation entity 110/220 may transmit a transportation complete response message to the user device 102 in response to the transportation complete request message. The transportation complete response message may, e.g., confirm the route taken, fare charged, etc. Table 8, by way of example, illustrates data fields, data elements, and contents thereof that all or some of which may be included in a transportation complete response message. Additionally, Table 8 provides suggestions of which data fields or data elements may be considered mandatory (M) or optional (O) in a transportation complete response message.

TABLE 8

| Data Field (DF) Data Element (DE) | Data Element (DE) | Contents (DF, DE) | Mandatory/ Optional |
|---|---|---|---|
| TemporaryID | 4 octet random device identifier to identify requestor and ensure anonymity | DE_TemporaryID ::= OCTET STRING (SIZE(4)) | M |
| Rider Ingress Location | Rider ingress location | DE_Latitude DE_Longitude | M |
| Rider Egress (disembark) Location | Rider egress location | DE_Latitude DE_Longitude | M |
| Fare | Toll/Fare | Currency | M |

Figure 5:
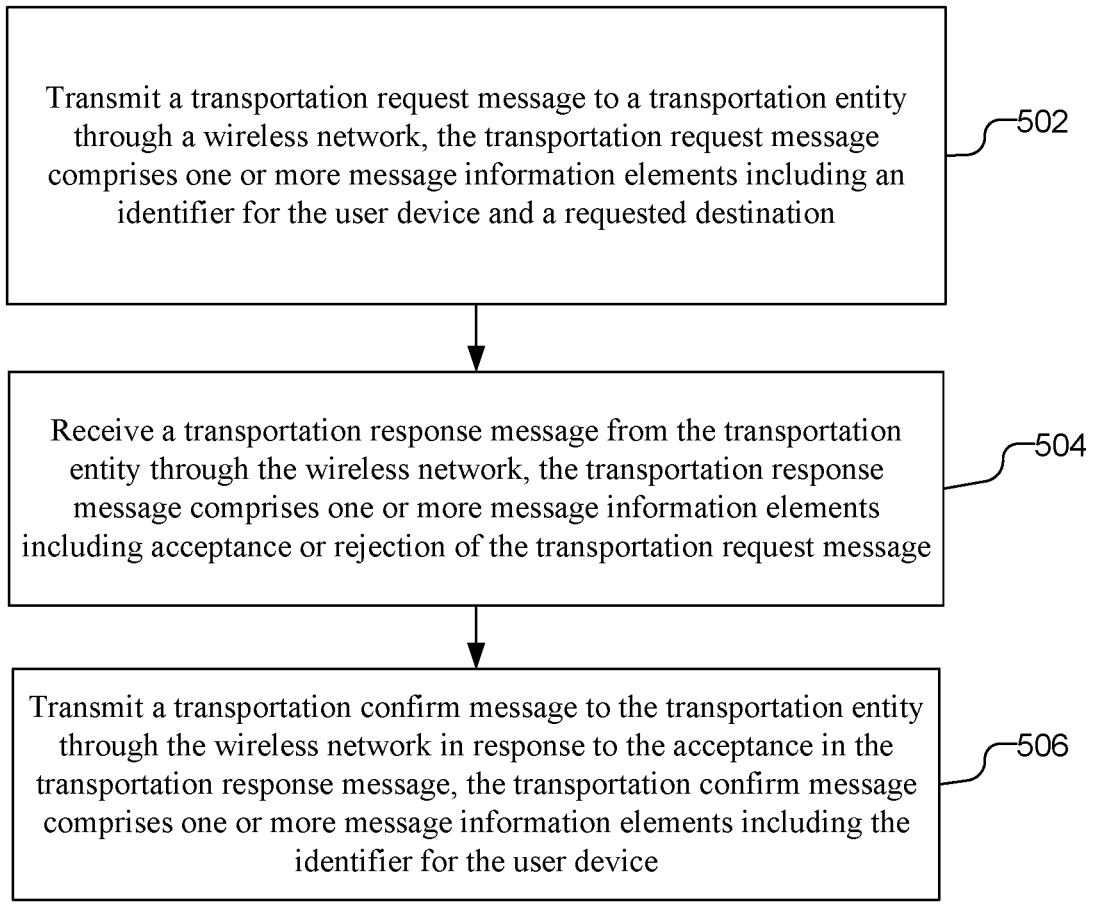
FIG. 5 is a flow chart illustrating a method of performing information exchange for a transportation service by a user device.

FIG. 5 is a flow chart illustrating a method of performing information exchange for a transportation service by a user device, such as user device 102. As illustrated in block 502, the user device transmits a transportation request message to a transportation entity wirelessly, the transportation request message comprises one or more message information elements including an identifier for the user device and a requested destination, e.g., as discussed at stage 1 of FIG. 3 or stage 1 of FIG. 4. By way of example, the transportation entity may be a transport vehicle 110, a transport server 220, or both. At block 504, a transportation response message is received from the transportation entity wirelessly, the transportation response message comprises one or more message information elements including acceptance or rejection of the transportation request message, e.g., as discussed at stage 3 or 4 of FIG. 3 or stage 2 of FIG. 4. At block 506, a transportation confirm message is transported to the transportation entity wirelessly in response to the acceptance in the transportation response message, the transportation confirm message comprises one or more message information elements including the identifier for the user device, e.g., as discussed at stage 3 of FIG. 4.

In one implementation, the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

In one implementation, the transportation request message, the transportation response message, and the transportation confirm message are encapsulated in data payloads in a Device-to-Device (D2D) communication link, comprising one or more of a dedicated short-range communication (DSRC), a cellular Vehicle-to-Everything (C-V2X) communication, or a 5G New Radio (NR) communication.

In one implementation, the one or more message information elements in the transportation request message further comprise at least one of a type of transport device requested, a number of users, a validity time for the transportation request message, a maximum travel time or required destination arrival time, or a combination thereof.

In one implementation, the one or more message information elements in the transportation request message further comprise at least one of a user type, a willingness to share transport vehicle, a maximum fare, a requested departure time, a beacon proximity threshold, or a combination thereof.

In one implementation, the one or more message information elements in the transportation response message further comprise at least one of a transportation type, a transportation identifier, a fare, an indication of whether the transportation is shared or individual, an estimated time of arrival for pickup and an estimated time of arrival to destination, or a combination thereof.

In one implementation, the one or more message information elements in the transportation confirm message further comprise at least one of the requested destination and estimated time of arrival for pickup, or a combination thereof.

In one implementation, the user device may further transmit a transportation status request message to the transportation entity wirelessly, the transportation status request message comprises one or more message information elements including a query for information related to a current location, e.g., as discussed at stage 5 of FIG. 3 or stage 5 of FIG. 4. The user device may further receive a transportation status message from the transportation entity wirelessly, the transportation status message comprises one or more message information elements including information related to the current location, e.g., as discussed at stage 5 of FIG. 3 or stage 6 of FIG. 4. The user device may be further configured to determine an estimate of arrival to the requested destination using the information related to the current location.

In one implementation, the user device may further transmit a transportation status request message to the transportation entity wirelessly, the transportation status request message comprises one or more message information elements including the identifier for the user device, a query for information related to an estimate of arrival to the requested destination, e.g., as discussed at stage 5 of FIG. 3 or stage 5 of FIG. 4. The user device may further receive a transportation status message from the transportation entity wirelessly, the transportation status message comprises one or more message information elements including the estimate of arrival to destination, e.g., as discussed at stage 5 of FIG. 3 or stage 6 of FIG. 4. For example, the estimate of arrival to destination comprises one or more of estimated time of arrival to destination and estimated number of stops to destination. In another example, the one or more message information elements in the transportation status message further includes a destination of the transport vehicle nearest the requested destination.

In one implementation, the user device may transmit a transportation complete request message to the transportation entity wirelessly, the transportation status request message comprises one or more message information elements including the identifier for the user device, and a request to disembark, e.g., as discussed at stage 6 of FIG. 3 or stage 7 of FIG. 4. The user device may further receive a transportation complete acknowledgement message from the transportation entity wirelessly, the transportation complete acknowledgement message comprises one or more message information elements including an estimate of arrival to destination and a confirmation of the request to disembark, e.g., as discussed at stage 8 or stage 9 of FIG. 3 or stage 8 of FIG. 4. The user device may further receive a transportation complete response message from the transportation entity wirelessly, the transportation complete response message comprises one or more message information elements including the identifier for the user device, an ingress location, and an egress location. In one example, the transportation complete response message further comprises one or more message information elements including at least one of a fare and a request to provide periodic signals to validate that the user device has exited the transport vehicle.

Figure 6:
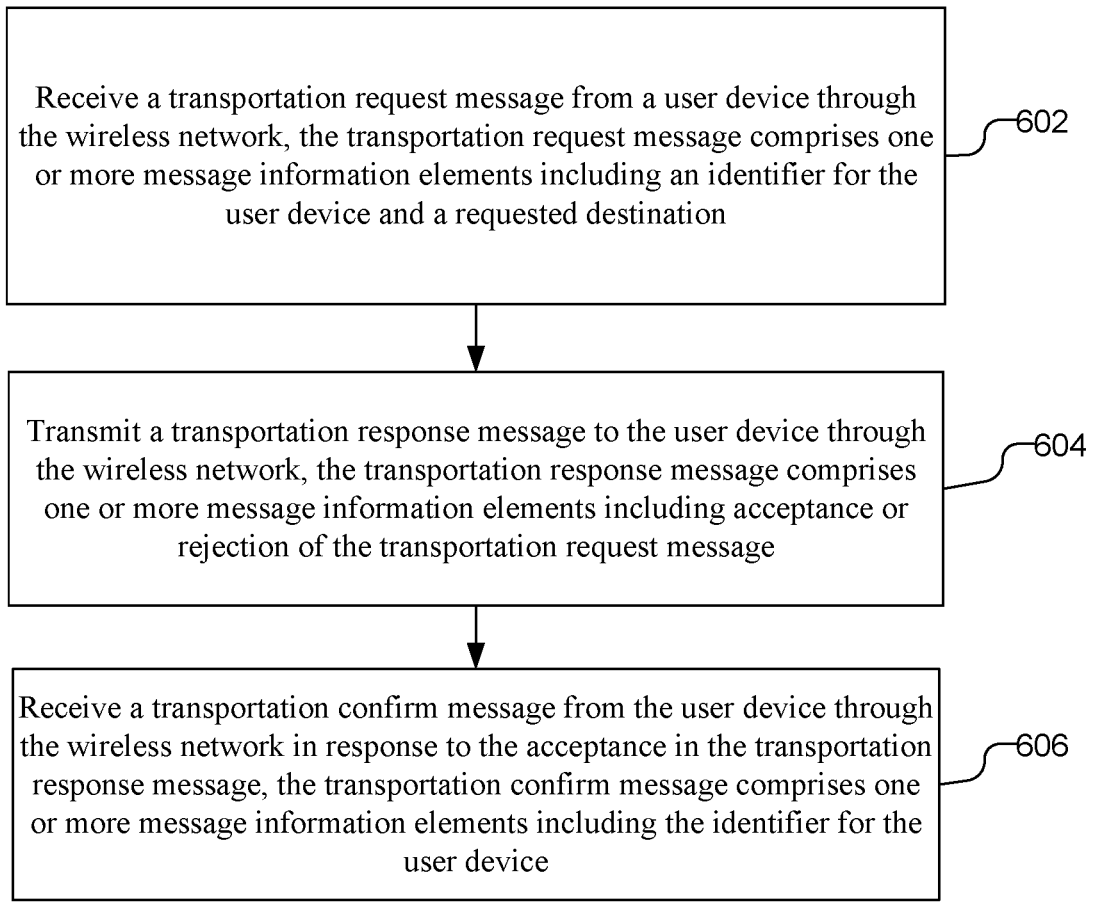
FIG. 6 is a flow chart illustrating a method of performing information exchange for a transportation service by a transportation entity.

FIG. 6 is a flow chart illustrating a method of performing information exchange for a transportation service by a transportation entity, wherein the transportation entity may comprise, e.g., a transport vehicle 110, a transport server 220, or both. As illustrated in block 602, the transportation entity receives a transportation request message from a user device wirelessly, the transportation request message comprises one or more message information elements including an identifier for the user device and a requested destination, e.g., as discussed at stage 1 of FIG. 3 or stage 1 of FIG. 4. At block 604, a transportation response message is transmitted to the user device wirelessly, the transportation response message comprises one or more message information elements including acceptance or rejection of the transportation request message, e.g., as discussed at stage 3 or 4 of FIG. 3 or stage 2 of FIG. 4. At block 606, a transportation confirm message is received from the user device wirelessly in response to the acceptance in the transportation response message, the transportation confirm message comprises one or more message information elements including the identifier for the user device, e.g., as discussed at stage 3 of FIG. 4.

In one implementation, the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

In one implementation, the transportation request message, the transportation response message, and the transportation confirm message are encapsulated in data payloads in a Device-to-Device (D2D) communication link, comprising one or more of a dedicated short-range communication (DSRC), a cellular Vehicle-to-Everything (C-V2X) communication, or a 5G New Radio (NR) communication.

In one implementation, the one or more message information elements in the transportation request message further comprise at least one of a type of transport device requested, a number of users, a validity time for the transportation request message, a maximum travel time or required destination arrival time, or a combination thereof.

In one implementation, the one or more message information elements in the transportation request message further comprise at least one of a user type, a willingness to share transport vehicle, a maximum fare, a requested departure time, a beacon proximity threshold, or a combination thereof.

In one implementation, the one or more message information elements in the transportation response message further comprise at least one of a transportation type, a transportation identifier, a fare, an indication of whether the transportation is shared or individual, an estimated time of arrival for pickup and an estimated time of arrival to destination, or a combination thereof.

In one implementation, the one or more message information elements in the transportation confirm message further comprise at least one of the requested destination and estimated time of arrival for pickup, or a combination thereof.

In one implementation, the transportation entity may further receive a transportation status request message from the user device wirelessly, the transportation status request message comprises one or more message information elements including a query for information related to a current location, e.g., as discussed at stage 5 of FIG. 3 or stage 5 of FIG. 4. The transportation entity may further transmit a transportation status message to the user device wirelessly, the transportation status message comprises one or more message information elements including information related to the current location, e.g., as discussed at stage 5 of FIG. 3 or stage 6 of FIG. 4.

In one implementation, the transportation entity may further receive a transportation status request message from the user device wirelessly, the transportation status request message comprises one or more message information elements including the identifier for the user device, a query information related to an estimate of arrival to the requested destination, e.g., as discussed at stage 5 of FIG. 3 or stage 5 of FIG. 4. The transportation entity may further transmit a transportation status message to the user device wirelessly, the transportation status message comprises one or more message information elements including the estimate of arrival to destination, e.g., as discussed at stage 5 of FIG. 3 or stage 6 of FIG. 4. For example, the estimate of arrival to destination comprises one or more of estimated time of arrival to destination and estimated number of stops to destination. In another example, the one or more message information elements in the transportation status message further includes a destination of the transport vehicle nearest the requested destination.

In one implementation, the transportation entity may further receive a transportation complete request message from the user device wirelessly, the transportation status request message comprises one or more message information elements including the identifier for the user device, and a request to disembark, e.g., as discussed at stage 6 of FIG. 3 or stage 7 of FIG. 4. The transportation entity may further transmit a transportation complete acknowledgement message to the user device wirelessly, the transportation complete acknowledgement message comprises one or more message information elements including an estimate of arrival to destination and a confirmation of the request to disembark, e.g., as discussed at stage 8 or stage 9 of FIG. 3 or stage 8 of FIG. 4. The transportation entity may further transmit a transportation complete response message to the user device wirelessly, the transportation complete response message comprises one or more message information elements including the identifier for the user device, an ingress location, and an egress location, e.g., as discussed at stage 8 or stage 9 of FIG. 3 or stage 9 of FIG. 4. In one example, the transportation complete response message further comprises one or more message information elements including at least one of a fare and a request to provide periodic signals to validate that the user device has exited the transport vehicle.

Figure 7:
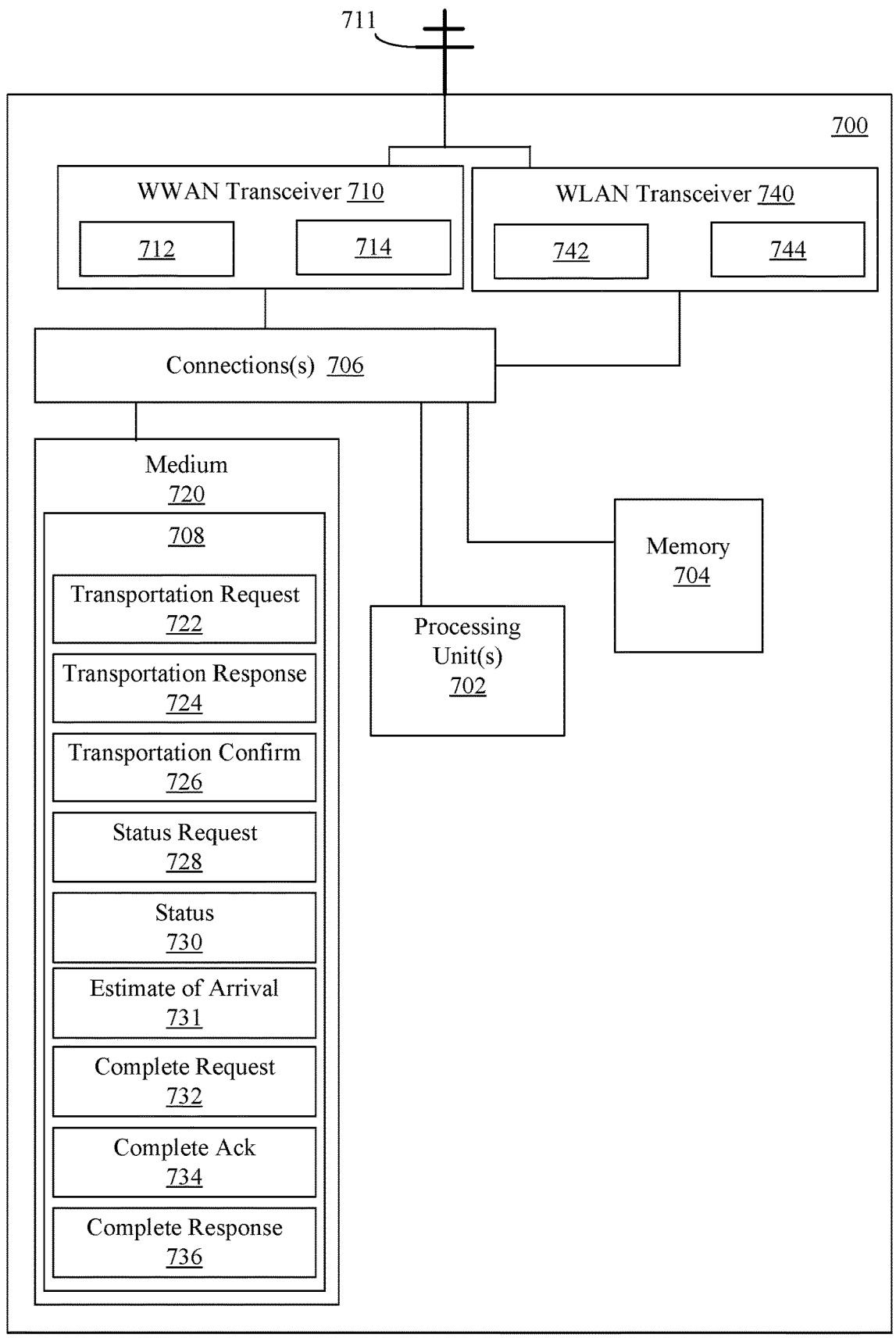
FIG. 7 shows a schematic block diagram illustrating certain exemplary features of a user device configured to perform an information exchange for a transportation service with a transportation entity.

FIG. 7 shows a schematic block diagram illustrating certain exemplary features of a user device 700, which may be, e.g., user device 102 shown in FIGS. 1-3, which is configured to perform an information exchange for a transportation service with a transportation entity, which may be a transport vehicle 110, a transport server 220, or both. The user device 700 may, for example, include one or more processors 702, memory 704, a Wireless Wide Area Network (WWAN) transceiver 710, and a Wireless Local Area Network (WLAN) transceiver 740, which may be operatively coupled with one or more connections 706 (e.g., buses, lines, fibers, links, etc.) to non-transitory computer readable medium 720 and memory 704. The user device 700 may further include additional items, which are not shown, such as a user interface that may include e.g., a display, a keypad or other input device, such as virtual keypad on the display, through which a user may interface with the user device, or a satellite positioning system receiver. In certain example implementations, all or part of user device 700 may take the form of a chipset, and/or the like. Transceiver 710 may be, e.g., a cellular transceiver, and may be configured to transmit and receive inter-vehicle communications, as illustrated in FIGS. 1 and 2. The transceiver 710 may include a transmitter 712 enabled to transmit one or more signals over one or more types of wireless communication links and a receiver 714 to receive one or more signals transmitted over the one or more types of wireless communication links. Transceiver 740 may be, e.g., a short range transceiver, and may be configured to transmit and receive inter-vehicle communications wirelessly, as illustrated in FIGS. 1 and 2. The transceiver 740 may include a transmitter 742 enabled to transmit one or more signals over one or more types of wireless communication links and a receiver 744 to receive one or more signals transmitted over the one or more types of wireless communication links. The transceivers 710 and 740 enable the user device 700 to communicate with transportation entities using D2D communication links, such as DSRC, C-V2X, or 5G NR.

In some embodiments, user device 700 may include antenna 711, which may be internal or external. The antenna 711 may be used to transmit and/or receive signals processed by transceiver 710 and/or transceiver 740. In some embodiments, user device antenna 711 may be coupled to transceiver 710 and/or transceiver 740. In some embodiments, measurements of signals received (transmitted) by user device 700 may be performed at the point of connection of the user device antenna 711 and transceiver 710 and/or transceiver 740. For example, the measurement point of reference for received (transmitted) RF signal measurements may be an input (output) terminal of the receivers 714, 744 (transmitters 712, 742) and an output (input) terminal of the user device antenna 711. In a user device 700 with multiple user device antennas 711 or antenna arrays, the antenna connector may be viewed as a virtual point representing the aggregate output (input) of multiple user device antennas.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of user device 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in user device 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in user device 700 is merely exemplary, and as such the functionality of the modules and/or data structures may be combined, separated, and/or be structured in different ways depending upon the implementation of the user device 700.

The medium 720 and/or memory 704 may include transportation request module 722 that when implemented by the one or more processors 702 configures the one or more processors 702 to transmit a transportation request message to a transportation entity, e.g., via transceiver 710 or transceiver 740. The transportation request message may include one or more message information elements including an identifier for the user device 700, a type of transport vehicle requested, a number of users, and a requested destination, which may be user selected. The transportation request message may further include one or more of a validity time for the transportation request message, a maximum travel time or required destination arrival time, a user type, a willingness to share transport vehicle, a maximum fare, a requested departure time, a beacon proximity threshold, or a combination thereof.

The medium 720 and/or memory 704 may include a transportation response module 724 that that when implemented by the one or more processors 702 configures the one or more processors 702 to receive a transportation response message from the transportation entity, e.g., via transceiver 710 or transceiver 740. The transportation response message may include one or more message information elements including an acceptance or rejection of the transportation request message. The transportation response message may further include at least one of a transportation type, a transportation identifier, a fare, an indication of whether the transportation is shared or individual, an estimated time of arrival for pickup and an estimated time of arrival to destination, or a combination thereof.

The medium 720 and/or memory 704 may include transportation confirm module 726 that when implemented by the one or more processors 702 configures the one or more processors 702 to transmit a transportation confirm message to the transportation entity in response to an acceptance in the transportation response message, e.g., via transceiver 710 or transceiver 740. The transportation confirm message may include one or more message information elements including the identifier for the user device. The transportation confirm message may further include at least one of the requested destination and estimated time of arrival for pickup, or a combination thereof.

The medium 720 and/or memory 704 may include a status request module 728 that when implemented by the one or more processors 702 configures the one or more processors 702 to transmit a status request message to the transportation entity, e.g., via transceiver 710 or transceiver 740, e.g., in response to a user input. The status request message may include one or more message information elements including a query for information related to a current location or an identifier for the user device 700 and a query for information related to an estimate of arrival to the requested destination.

The medium 720 and/or memory 704 may include a status module 730 that when implemented by the one or more processors 702 configures the one or more processors 702 to receive a status message from the transportation entity, e.g., via transceiver 710 or transceiver 740, e.g., in response to a status request message. The transportation status message may include one or more message information elements including information related to the current location or an estimate of arrival to destination. The estimate of arrival to destination may be an estimated time of arrival to destination or an estimated number of stops to destination. The transportation status message may include a destination of the transport vehicle nearest the requested destination.

The medium 720 and/or memory 704 may include an estimate of arrival module 731 that when implemented by the one or more processors 702 configures the one or more processors 702 to determine an estimate of arrival to the requested destination using the information related to the current location. For example, based on the current location, an estimated time of arrival to the destination or estimated number of stops may be to the destination may be determined.

The medium 720 and/or memory 704 may include a complete request module 732 that when implemented by the one or more processors 702 configures the one or more processors 702 to transmit a complete request message to the transportation entity, e.g., via transceiver 710 or transceiver 740, e.g., in response to a user input. The complete request message may include one or more message information elements including an identifier for the user device 700 and a request to disembark.

The medium 720 and/or memory 704 may include a complete acknowledgement module 734 that when implemented by the one or more processors 702 configures the one or more processors 702 to receive a complete acknowledgement message from the transportation entity, e.g., via transceiver 710 or transceiver 740, e.g., in response to the complete request message. The complete acknowledgement message may include one or more message information elements including an estimate of arrival to destination and a confirmation of the request to disembark.

The medium 720 and/or memory 704 may include a complete response module 736 that when implemented by the one or more processors 702 configures the one or more processors 702 to receive a complete response message from the transportation entity, e.g., via transceiver 710 or transceiver 740, e.g., in response to the complete request message. The complete response message may include one or more message information elements including the identifier for the user device, an ingress location, an egress location, and a fare. The complete response message may further include a request to provide periodic signals to validate that the user device has exited the transport vehicle.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support OTDOA measurements in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

Thus, a user device, such as user device 700, may include a means for transmitting a transportation request message to a transportation entity wirelessly, the transportation request message comprises one or more message information elements including an identifier for the user device and a requested destination, which may be, e.g., the wireless transceiver 710 or wireless transceiver 740 and one or more processors 702 with dedicated hardware or implementing executable code or software instructions in medium 720 and/or memory 704 such as the transportation request module 722. A means for receiving a transportation response message from the transportation entity wirelessly, the transportation response message comprises one or more message information elements including acceptance or rejection of the transportation request message may be, e.g., the wireless transceiver 710 or wireless transceiver 740 and one or more processors 702 with dedicated hardware or implementing executable code or software instructions in medium 720 and/or memory 704 such as the transportation response module 724. A means for transmitting a transportation confirm message to the transportation entity wirelessly in response to the acceptance in the transportation response message, the transportation confirm message comprises one or more message information elements including the identifier for the user device may be, e.g., the wireless transceiver 710 or wireless transceiver 740 and one or more processors 702 with dedicated hardware or implementing executable code or software instructions in medium 720 and/or memory 704 such as the transportation confirm module 726.

In one implementation, the user device may further include a means for transmitting a transportation status request message to the transportation entity wirelessly, the transportation status request message comprises one or more message information elements including a query for information related to a current location, which may be, e.g., the wireless transceiver 710 or wireless transceiver 740 and one or more processors 702 with dedicated hardware or implementing executable code or software instructions in medium 720 and/or memory 704 such as the status request module 728. A means for receiving a transportation status message from the transportation entity wirelessly, the transportation status message comprises one or more message information elements including information related to the current location may be, e.g., the wireless transceiver 710 or wireless transceiver 740 and one or more processors 702 with dedicated hardware or implementing executable code or software instructions in medium 720 and/or memory 704 such as the status module 730. The user device may further include a means for determining an estimate of arrival to the requested destination using the information related to the current location, which may be, e.g., the one or more processors 702 with dedicated hardware or implementing executable code or software instructions in medium 720 and/or memory 704 such as the estimate of arrival module 731.

In one implementation, the user device may further include a means for transmitting a transportation status request message to the transportation entity wirelessly, the transportation status request message comprises one or more message information elements including the identifier for the user device and a query for information related to an estimate of arrival to the requested destination, which may be, e.g., the wireless transceiver 710 or wireless transceiver 740 and one or more processors 702 with dedicated hardware or implementing executable code or software instructions in medium 720 and/or memory 704 such as the status request module 728. A means for receiving a transportation status message from the transportation entity wirelessly, the transportation status message comprises one or more message information elements including the estimate of arrival to destination may be, e.g., the wireless transceiver 710 or wireless transceiver 740 and one or more processors 702 with dedicated hardware or implementing executable code or software instructions in medium 720 and/or memory 704 such as the status module 730.

In one implementation, the user device may further include a means for transmitting a transportation complete request message to the transportation entity wirelessly, the transportation status request message comprises one or more message information elements including the identifier for the user device, and a request to disembark, which may be, e.g., the wireless transceiver 710 or wireless transceiver 740 and one or more processors 702 with dedicated hardware or implementing executable code or software instructions in medium 720 and/or memory 704 such as the complete request module 732. A means for receiving a transportation complete acknowledgement message from the transportation entity wirelessly, the transportation complete acknowledgement message comprises one or more message information elements including an estimate of arrival to destination and a confirmation of the request to disembark may be, e.g., the wireless transceiver 710 or wireless transceiver 740 and one or more processors 702 with dedicated hardware or implementing executable code or software instructions in medium 720 and/or memory 704 such as the complete acknowledgement module 734. A means for receiving a transportation complete response message from the transportation entity wirelessly, the transportation complete response message comprises one or more message information elements includes the identifier for the user device, an ingress location, and an egress location may be, e.g., the wireless transceiver 710 or wireless transceiver 740 and one or more processors 702 with dedicated hardware or implementing executable code or software instructions in medium 720 and/or memory 704 such as the complete response module 736.

Figure 8:
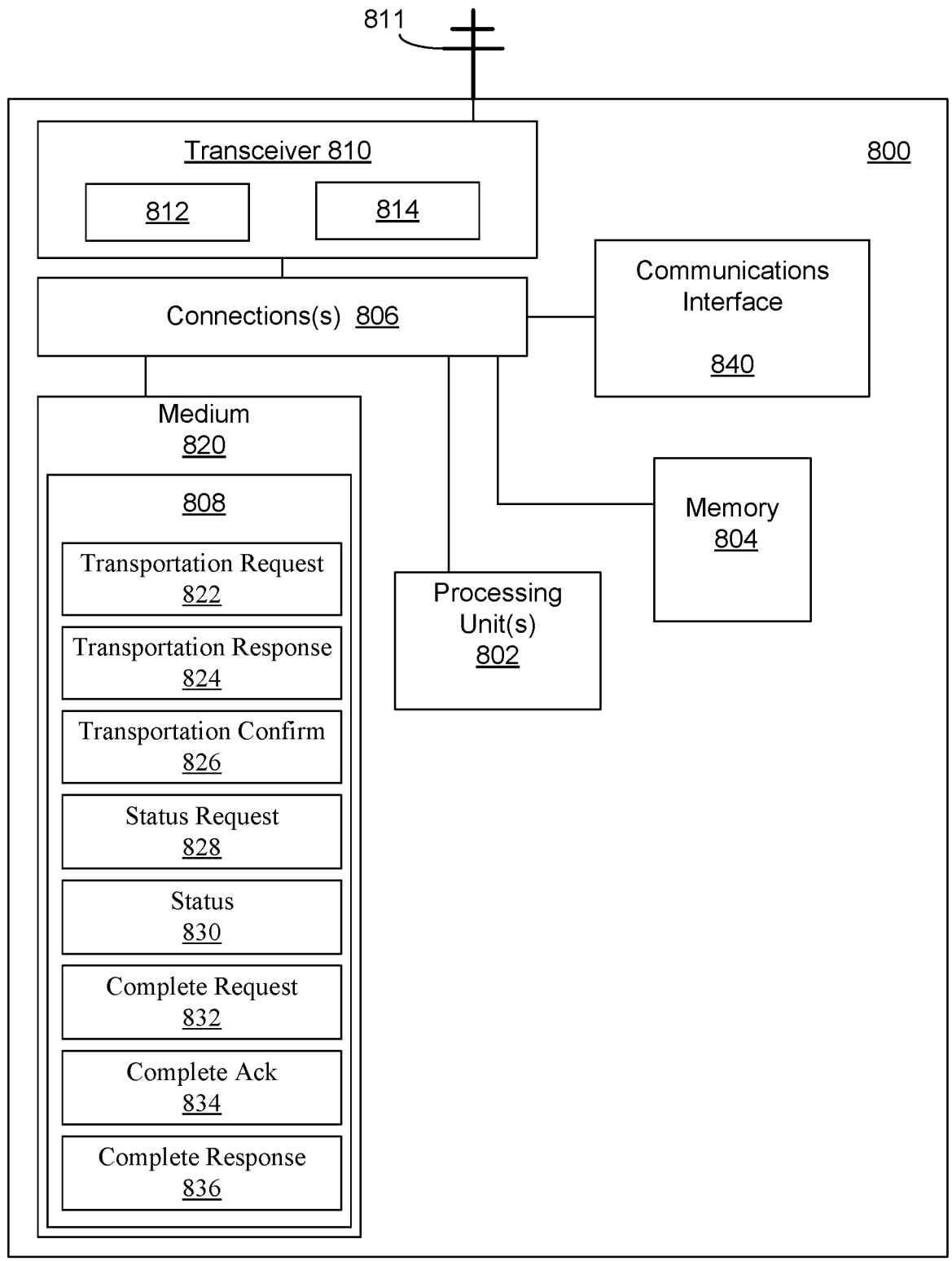
FIG. 8 shows a schematic block diagram illustrating certain exemplary features of a schematic block diagram illustrating certain exemplary features of a transportation entity configured to perform an information exchange for a transportation service with a user device.

FIG. 8 shows a schematic block diagram illustrating certain exemplary features of a schematic block diagram illustrating certain exemplary features of a transportation entity 800, which may be, e.g., a transport vehicle 110 or transport server 220 shown in FIGS. 1-3, which is configured to perform an information exchange for a transportation service with a user device, such as user device 102. In some embodiments, transportation entity 800 may include, for example, one or more processors 802, memory 804, a transceiver 810 (e.g., wireless interface), and (as applicable) communications interface 806 (e.g., wireline or wireless interface to other transportation entities, e.g., to a transport vehicle 110 or transport server 220), which may be operatively coupled with one or more connections 806 (e.g., buses, lines, fibers, links, etc.) to non-transitory computer readable medium 820 and memory 804. In certain example implementations, some portion of transportation entity 800 may take the form of a chipset, and/or the like.

Transceiver 810 may, for example, include a transmitter 812 enabled to transmit one or more signals over one or more types of wireless communication links and a receiver 814 to receive one or more signals transmitted over the one or more types of wireless communication links. The transceiver 810 enables the transportation entity 800 to communicate with user devices using D2D communication links, such as DSRC, C-V2X, or 5G NR. Transportation entity 800 may include antenna 811 to transmit and/or receive signals processed by transceiver 810. Communications interface 840 may include a variety of wired and wireless connections that support wired transmission and/or reception and, if desired, may additionally or alternatively support transmission and reception of one or more signals over one or more types of wireless communication systems. Communications interface 806 may also include interfaces for communication with various other computers and peripherals. For example, in one embodiment, communications interface 806 may comprise network interface cards, input-output cards, chips and/or ASICs that implement one or more of the communication functions performed by transportation entity 800.

The one or more processors 802 may be implemented using a combination of hardware, firmware, and software. For example, one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of transportation entity 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in transportation entity 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in mobile device 82 is merely exemplary, and as such the functionality of the modules and/or data structures may be combined, separated, and/or be structured in different ways depending upon the implementation of the transportation entity 800.

The medium 820 and/or memory 804 may include transportation request module 722 that when implemented by the one or more processors 702 configures the one or more processors 702 to receive a transportation request message from a user device 102, e.g., via transceiver 710. The transportation request message may include one or more message information elements including an identifier for the user device, a type of transport vehicle requested, a number of users, and a requested destination. The transportation request message may further include one or more of a validity time for the transportation request message, a maximum travel time or required destination arrival time, a user type, a willingness to share transport vehicle, a maximum fare, a requested departure time, a beacon proximity threshold, or a combination thereof.

The medium 820 and/or memory 804 may include a transportation response module 824 that that when implemented by the one or more processors 802 configures the one or more processors 802 to transmit a transportation response message to the user device 102, e.g., via transceiver 810. The transportation response message may include one or more message information elements including an acceptance or rejection of the transportation request message. The transportation response message may further include at least one of a transportation type, a transportation identifier, a fare, an indication of whether the transportation is shared or individual, an estimated time of arrival for pickup and an estimated time of arrival to destination, or a combination thereof.

The medium 820 and/or memory 804 may include transportation confirm module 826 that when implemented by the one or more processors 802 configures the one or more processors 802 to receive a transportation confirm message from the user device 102 in response to an acceptance in the transportation response message, e.g., via transceiver 810. The transportation confirm message may include one or more message information elements including the identifier for the user device. The transportation confirm message may further include at least one of the requested destination and estimated time of arrival for pickup, or a combination thereof.

The medium 820 and/or memory 804 may include a status request module 828 that when implemented by the one or more processors 802 configures the one or more processors 802 to receive a status request message from the user device 102, e.g., via transceiver 810. The status request message may include one or more message information elements including a query for information related to a current location or an identifier for the user device 800 and a query for information related to an estimate of arrival to the requested destination.

The medium 820 and/or memory 804 may include a status module 830 that when implemented by the one or more processors 802 configures the one or more processors 802 to transmit a status message to the user device 102, e.g., via transceiver 810, e.g., in response to a status request message. The transportation status message may include one or more message information elements including information related to the current location or an estimate of arrival to destination. The estimate of arrival to destination may be an estimated time of arrival to destination or an estimated number of stops to destination. The transportation status message may include a destination of the transport vehicle nearest the requested destination The medium 820 and/or memory 804 may include a complete request module 832 that when implemented by the one or more processors 802 configures the one or more processors 802 to receive a complete request message from the user device 102, e.g., via transceiver 810. The complete request message may include one or more message information elements including an identifier for the user device 800 and a request to disembark.

The medium 820 and/or memory 804 may include a complete acknowledgement module 834 that when implemented by the one or more processors 802 configures the one or more processors 802 to transmit a complete acknowledgement message to the user device 102, e.g., via transceiver 810, e.g., in response to the complete request message. The complete acknowledgement message may include one or more message information elements including an estimate of arrival to destination and a confirmation of the request to disembark.

The medium 820 and/or memory 804 may include a complete response module 836 that when implemented by the one or more processors 802 configures the one or more processors 802 to transmit a complete response message to the user device 102, e.g., via transceiver 810, e.g., in response to the complete request message. The complete response message may include one or more message information elements including the identifier for the user device, an ingress location, an egress location, and a fare. The complete response message may further include a request to provide periodic signals to validate that the user device has exited the transport vehicle.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support OTDOA measurements in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Thus, a transportation entity, e.g., transportation entity 800, may include a means for receiving a transportation request message from a user device wirelessly, the transportation request message comprises one or more message information elements including an identifier for the user device and a requested destination, which may be, e.g., the transceiver 810 and one or more processors 802 with dedicated hardware or implementing executable code or software instructions in medium 820 and/or memory 804 such as the transportation request module 822. A means for transmitting a transportation response message to the user device wirelessly, the transportation response message comprises one or more message information elements including acceptance or rejection of the transportation request message may be, e.g., the transceiver 810 and one or more processors 802 with dedicated hardware or implementing executable code or software instructions in medium 820 and/or memory 804 such as the transportation response module 824. A means for receiving a transportation confirm message from the user device wirelessly in response to the acceptance in the transportation response message, the transportation confirm message comprises one or more message information elements including the identifier for the user device may be, e.g., the transceiver 810 and one or more processors 802 with dedicated hardware or implementing executable code or software instructions in medium 820 and/or memory 804 such as the transportation confirm module 826.

In one implementation, the transportation entity may include a means for receiving a transportation status request message from the user device wirelessly, the transportation status request message comprises one or more message information elements including a query for information related to a current location, which may be, e.g., the transceiver 810 and one or more processors 802 with dedicated hardware or implementing executable code or software instructions in medium 820 and/or memory 804 such as the status request module 828. A means for transmitting a transportation status message to the user device wirelessly, the transportation status message comprises one or more message information elements including information related to the current location may be, e.g., the transceiver 810 and one or more processors 802 with dedicated hardware or implementing executable code or software instructions in medium 820 and/or memory 804 such as the status module 830.

In one implementation, the transportation entity may include a means for receiving a transportation status request message from the user device wirelessly, the transportation status request message comprises one or more message information elements including the identifier for the user device and a query for information related to an estimate of arrival to the requested destination, which may be, e.g., the transceiver 810 and one or more processors 802 with dedicated hardware or implementing executable code or software instructions in medium 820 and/or memory 804 such as the status request module 828. A means for transmitting a transportation status message to the user device wirelessly, the transportation status message comprises one or more message information elements including the estimate of arrival to destination may be, e.g., the transceiver 810 and one or more processors 802 with dedicated hardware or implementing executable code or software instructions in medium 820 and/or memory 804 such as the status module 830.

In one implementation, the transportation entity may include a means for receiving a transportation complete request message from the user device wirelessly, the transportation status request message comprises one or more message information elements including the identifier for the user device, and a request to disembark, which may be, e.g., the transceiver 810 and one or more processors 802 with dedicated hardware or implementing executable code or software instructions in medium 820 and/or memory 804 such as the complete request module 832. A means for transmitting a transportation complete acknowledgement message to the user device wirelessly, the transportation complete acknowledgement message comprises one or more message information elements including an estimate of arrival to destination and a confirmation of the request to disembark may be, e.g., the transceiver 810 and one or more processors 802 with dedicated hardware or implementing executable code or software instructions in medium 820 and/or memory 804 such as the complete acknowledgement module 834. A means for transmitting a transportation complete response message to the user device wirelessly, the transportation complete response message comprises one or more message information elements including the identifier for the user device, an ingress location, and an egress location may be, e.g., the transceiver 810 and one or more processors 802 with dedicated hardware or implementing executable code or software instructions in medium 820 and/or memory 804 such as the complete response module 836.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of performing information exchange for a transportation service by a user device, the method comprising:

transmitting a transportation request message to a transportation entity wirelessly, the transportation request message comprises one or more message information elements including an identifier for the user device and a requested destination;

receiving a transportation response message from the transportation entity wirelessly, the transportation response message comprises one or more message information elements including acceptance or rejection of the transportation request message; and transmitting a transportation confirm message to the transportation entity wirelessly in response to the acceptance in the transportation response message, the transportation confirm message comprises one or more message information elements including the identifier for the user device.

2. The method of clause 1, wherein the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

3. The method of clause 1, wherein the transportation request message, the transportation response message, and the transportation confirm message are encapsulated in data payloads in a Device-to-Device (D2D) communication link, comprising one or more of a dedicated short-range communication (DSRC), a cellular Vehicle-to-Everything (C-V2X) communication, or a 5G New Radio (NR) communication.

4. The method of any of clauses 1-3, wherein the one or more message information elements in the transportation request message further comprise at least one of a type of transport device requested, a number of users, a validity time for the transportation request message, a maximum travel time or required destination arrival time, or a combination thereof.

5. The method of any of clauses 1-4, wherein the one or more message information elements in the transportation request message further comprise at least one of a user type, a willingness to share transport vehicle, a maximum fare, a requested departure time, a beacon proximity threshold, or a combination thereof.

6. The method of any of clauses 1-5, wherein the one or more message information elements in the transportation response message further comprise at least one of a transportation type, a transportation identifier, a fare, an indication of whether the transportation is shared or individual, an estimated time of arrival for pickup and an estimated time of arrival to destination, or a combination thereof.

7. The method of any of clauses 1-6, wherein the one or more message information elements in the transportation confirm message further comprise at least one of the requested destination and estimated time of arrival for pickup, or a combination thereof.

8. The method of any of clauses 1-7, further comprising:
transmitting a transportation status request message to the transportation entity wirelessly, the transportation status request message comprises one or more message information elements including a query for information related to a current location; and
receiving a transportation status message from the transportation entity wirelessly, the transportation status message comprises one or more message information elements including information related to the current location.

9. The method of clause 8, further comprising determining an estimate of arrival to the requested destination using the information related to the current location.

10. The method of any of clauses 1-9, further comprising:
transmitting a transportation status request message to the transportation entity wirelessly, the transportation status request message comprises one or more message information elements including the identifier for the user device, a query for information related to an estimate of arrival to the requested destination; and
receiving a transportation status message from the transportation entity wirelessly, the transportation status message comprises one or more message information elements including the estimate of arrival to destination.

11. The method of clause 10, wherein the estimate of arrival to destination comprises one or more of estimated time of arrival to destination and estimated number of stops to destination.

12. The method of clause 10, wherein the one or more message information elements in the transportation status message further includes a destination of the transport vehicle nearest the requested destination.

13. The method of any of clauses 1-12, further comprising:
transmitting a transportation complete request message to the transportation entity wirelessly, the transportation complete request message comprises one or more message information elements including the identifier for the user device, and a request to disembark;
receiving a transportation complete acknowledgement message from the transportation entity wirelessly, the transportation complete acknowledgement message comprises one or more message information elements including an estimate of arrival to destination and a confirmation of the request to disembark.

14. The method of clause 13, further comprising:
receiving a transportation complete response message from the transportation entity wirelessly, the transportation complete response message comprises one or more message information elements includes the identifier for the user device, an ingress location, and an egress location.

15. The method of clause 14, wherein the transportation complete response message further comprises one or more message information elements including at least one of a fare and a request to provide periodic signals to validate that the user device has exited the transport vehicle.

16. The method of any of clauses 1-15, wherein the transportation entity comprises a transport vehicle, a transport server, or both.

17. A user device configured to perform information exchange for a transportation service, the user device comprising:
a wireless transceiver configured to communicate with a transportation entity wirelessly;
at least one memory; and
at least one processor coupled to the wireless transceiver and the at least one memory, the at least one processor configured to:
transmit a transportation request message to the transportation entity, via the wireless transceiver, the transportation request message comprises one or more message information elements including an identifier for the user device, and a requested destination;
receive a transportation response message from the transportation entity, via the wireless transceiver, the transportation response message comprises one or more message information elements including acceptance or rejection of the transportation request message; and
transmit a transportation confirm message to the transportation entity, via the wireless transceiver, in response to the acceptance in the transportation response message, the transportation confirm message comprises one or more message information elements including the identifier for the user device.

18. The user device of clause 17, wherein the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

19. The user device of clause 17, wherein the transportation request message, the transportation response message, and the transportation confirm message are encapsulated in data payloads in a Device-to-Device (D2D) communication link, comprising one or more of a dedicated short-range communication (DSRC), a cellular Vehicle-to-Everything (C-V2X) communication, or a 5G New Radio (NR) communication.

20. The user device of any of clauses 17-19, wherein the one or more message information elements in the transportation request message further comprise at least one of a type of transport device requested, a number of users, a validity time for the transportation request message, a maximum travel time or required destination arrival time, or a combination thereof.

21. The user device of any of clauses 17-20, wherein the one or more message information elements in the transportation request message further comprise at least one of a user type, a willingness to share transport vehicle, a maximum fare, a requested departure time, a beacon proximity threshold, or a combination thereof.

22. The user device of any of clauses 17-21, wherein the one or more message information elements in the transportation response message further comprise at least one of a transportation type, a transportation identifier, a fare, an indication of whether the transportation is shared or individual, an estimated time of arrival for pickup and an estimated time of arrival to destination, or a combination thereof.

23. The user device of any of clauses 17-22, wherein the one or more message information elements in the transportation confirm message further comprise at least one of the requested destination and estimated time of arrival for pickup, or a combination thereof.

24. The user device of any of clauses 17-23, wherein the at least one processor is further configured to:
transmit, via the wireless transceiver, a transportation status request message to the transportation entity, the transportation status request message comprises one or more message information elements including a query for information related to a current location; and
receive, via the wireless transceiver, a transportation status message from the transportation entity, the transportation status message comprises one or more message information elements including information related to the current location.

25. The user device of clause 24, wherein the at least one processor is further configured to determine an estimate of arrival to the requested destination using the information related to the current location.

26. The user device of any of clauses 17-25, wherein the at least one processor is further configured to:
transmit a transportation status request message to the transportation entity, via the wireless transceiver, the transportation status request message comprises one or more message information elements including the identifier for the user device, a query for information related to an estimate of arrival to the requested destination; and
receive a transportation status message from the transportation entity, via the wireless transceiver, the transportation status message comprises one or more message information elements including the estimate of arrival to destination.

27. The user device of clause 26, wherein the estimate of arrival to destination comprises one or more of estimated time of arrival to destination and estimated number of stops to destination.

28. The user device of clause 26, wherein the one or more message information elements in the transportation status message further includes a destination of the transport vehicle nearest the requested destination.

29. The user device of any of clauses 17-28, wherein the at least one processor is further configured to:
transmit a transportation complete request message to the transportation entity, via the wireless transceiver, the transportation complete request message comprises one or more message information elements including the identifier for the user device, and a request to disembark;
receive a transportation complete acknowledgement message from the transportation entity, via the wireless transceiver, the transportation complete acknowledgement message comprises one or more message information elements including an estimate of arrival to destination and a confirmation of the request to disembark.

30. The user device of clause 29, wherein the at least one processor is further configured to:
receive a transportation complete response message from the transportation entity, via the wireless transceiver, the transportation complete response message comprises one or more message information elements includes the identifier for the user device, an ingress location, and an egress location.

31. The user device of clause 30, wherein the transportation complete response message further comprises one or more message information elements including at least one of a fare and a request to provide periodic signals to validate that the user device has exited the transport vehicle.

32. The user device of any of clauses 17-31, wherein the transportation entity comprises a transport vehicle, a transport server, or both.

33. A user device configured to perform information exchange for a transportation service, comprising:
means for transmitting a transportation request message to a transportation entity wirelessly, the transportation entity comprising one or both of a transport vehicle and a transport server, the transportation request message comprises one or more message information elements including an identifier for the user device, and a requested destination;
means for receiving a transportation response message from the transportation entity wirelessly, the transportation response message comprises one or more message information elements including acceptance or rejection of the transportation request message; and
means for transmitting a transportation confirm message to the transportation entity wirelessly in response to the acceptance in the transportation response message, the transportation confirm message comprises one or more message information elements including the identifier for the user device.

34. A non-transitory storage medium including program code stored thereon, the program code is operable to configure at least one processor in a user device to perform information exchange for a transportation service, comprising:
program code to transmit a transportation request message to a transportation entity wirelessly, the transportation entity comprising one or both of a transport vehicle and a transport server, the transportation request message comprises one or more message information elements including an identifier for the user device, and a requested destination;
program code to receive a transportation response message from the transportation entity wirelessly, the transportation response message comprises one or more message information elements including acceptance or rejection of the transportation request message; and
program code to transmit a transportation confirm message to the transportation entity wirelessly in response to the acceptance in the transportation response message, the transportation confirm message comprises one or more message information elements including the identifier for the user device.

35. A method of performing information exchange for a transportation service by a transportation entity, the method comprising:
receiving a transportation request message from a user device wirelessly, the transportation request message comprises one or more message information elements including an identifier for the user device, and a requested destination;
transmitting a transportation response message to the user device wirelessly, the transportation response message comprises one or more message information elements including acceptance or rejection of the transportation request message; and
receiving a transportation confirm message from the user device wirelessly in response to the acceptance in the transportation response message, the transportation confirm message comprises one or more message information elements including the identifier for the user device.

36. The method of clause 35, wherein the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

37. The method of clause 35, wherein the transportation request message, the transportation response message, and the transportation confirm message are encapsulated in data payloads in a Device-to-Device (D2D) communication link, comprising one or more of a dedicated short-range communication (DSRC), a cellular Vehicle-to-Everything (C-V2X) communication, or a 5G New Radio (NR) communication.

38. The method of any of clauses 35-37, wherein the one or more message information elements in the transportation request message further comprise at least one of a type of transport device requested, a number of users, a validity time for the transportation request message, a maximum travel time or required destination arrival time, or a combination thereof.

39. The method of any of clauses 35-38, wherein the one or more message information elements in the transportation request message further comprise at least one of a user type, a willingness to share transport vehicle, a maximum fare, a requested departure time, a beacon proximity threshold, or a combination thereof.

40. The method of any of clauses 35-39, wherein the one or more message information elements in the transportation response message further comprise at least one of a transportation type, a transportation identifier, a fare, an indication of whether the transportation is shared or individual, an estimated time of arrival for pickup and an estimated time of arrival to destination, or a combination thereof.

41. The method of any of clauses 35-40, wherein the one or more message information elements in the transportation confirm message further comprise at least one of the requested destination and estimated time of arrival for pickup, or a combination thereof.

42. The method of any of clauses 35-41, further comprising:
receiving a transportation status request message from the user device wirelessly, the transportation status request message comprises one or more message information elements including a query for information related to a current location; and
transmitting a transportation status message to the user device wirelessly, the transportation status message comprises one or more message information elements including information related to the current location.

43. The method of any of clauses 35-42, further comprising:
receiving a transportation status request message from the user device wirelessly, the transportation status request message comprises one or more message information elements including the identifier for the user device, a query for information related to an estimate of arrival to the requested destination; and
transmitting a transportation status message to the user device wirelessly, the transportation status message comprises one or more message information elements including the estimate of arrival to destination.

44. The method of clause 43, wherein the estimate of arrival to destination comprises one or more of estimated time of arrival to destination and estimated number of stops to destination.

45. The method of clause 43, wherein the one or more message information elements in the transportation status message further includes a destination of the transport vehicle nearest the requested destination.

46. The method of any of clauses 35-45, further comprising:
receiving a transportation complete request message from the user device wirelessly, the transportation complete request message comprises one or more message information elements including the identifier for the user device, and a request to disembark;
transmitting a transportation complete acknowledgement message to the user device wirelessly, the transportation complete acknowledgement message comprises one or more message information elements including an estimate of arrival to destination and a confirmation of the request to disembark.

47. The method of clause 46, further comprising:
transmitting a transportation complete response message to the user device wirelessly, the transportation complete response message comprises one or more message information elements including the identifier for the user device, an ingress location, and an egress location.

48. The method of clause 47, wherein the transportation complete response message further comprises one or more message information elements including at least one of a fare and a request to provide periodic signals to validate that the user device has exited the transport vehicle.

49. The method of any of clauses 35-48, wherein the transportation entity comprises a transport vehicle, a transport server, or both.

50. A transportation entity configured to perform information exchange for a transportation service, the transportation entity comprising one a transport vehicle and a transport server, the transportation entity comprising:
a wireless transceiver configured to communicate with a user device wirelessly;
at least one memory; and
at least one processor coupled to the wireless transceiver and the at least one memory, the at least one processor configured to:
receive a transportation request message from the user device, via the wireless transceiver, the transportation request message comprises one or more message information elements including an identifier for the user device, and a requested destination;
transmit a transportation response message to the user device, via the wireless transceiver, the transportation response message comprises one or more message information elements including acceptance or rejection of the transportation request message; and
receive a transportation confirm message from the user device, via the wireless transceiver, in response to the acceptance in the transportation response message, the transportation confirm message comprises one or more message information elements including the identifier for the user device.

51. The transportation entity of clause 50, wherein the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

52. The transportation entity of clause 50, wherein the transportation request message, the transportation response message, and the transportation confirm message are encapsulated in data payloads in a Device-to-Device (D2D) communication link, comprising one or more of a dedicated short-range communication (DSRC), a cellular Vehicle-to-Everything (C-V2X) communication, or a 5G New Radio (NR) communication.

53. The transportation entity of any of clauses 50-52, wherein the one or more message information elements in the transportation request message further comprise at least one of a type of transport device requested, a number of users, a validity time for the transportation request message, a maximum travel time or required destination arrival time, or a combination thereof.

54. The transportation entity of any of clauses 50-53, wherein the one or more message information elements in the transportation request message further comprise at least one of a user type, a willingness to share transport vehicle, a maximum fare, a requested departure time, a beacon proximity threshold, or a combination thereof.

55. The transportation entity of any of clauses 50-54, wherein the one or more message information elements in the transportation response message further comprise at least one of a transportation type, a transportation identifier, a fare, an indication of whether the transportation is shared or individual, an estimated time of arrival for pickup and an estimated time of arrival to destination, or a combination thereof.

56. The transportation entity of any of clauses 50-55, wherein the one or more message information elements in the transportation confirm message further comprise at least one of the requested destination and estimated time of arrival for pickup, or a combination thereof.

57. The transportation entity of any of clauses 50-56, wherein the at least one processor is further configured to:
receive, via the wireless transceiver, a transportation status request message from the user device, the transportation status request message comprises one or more message information elements including a query for information related to a current location; and
transmit, via the wireless transceiver, a transportation status message to the user device, the transportation status message comprises one or more message information elements including information related to the current location.

58. The transportation entity of any of clauses 50-57, wherein the at least one processor is further configured to:
receive a transportation status request message from the user device, via the wireless transceiver, the transportation status request message comprises one or more message information elements including the identifier for the user device, a query for information related to an estimate of arrival to the requested destination; and
transmit a transportation status message to the user device, via the wireless transceiver, the transportation status message comprises one or more message information elements including the estimate of arrival to destination.

59. The transportation entity of clause 58, wherein the estimate of arrival to destination comprises one or more of estimated time of arrival to destination and estimated number of stops to destination.

60. The transportation entity of clause 58, wherein the one or more message information elements in the transportation status message further includes a destination of the transport vehicle nearest the requested destination.

61. The transportation entity of any of clauses 50-60, wherein the at least one processor is further configured to:
receive a transportation complete request message from the user device, via the wireless transceiver, the transportation complete request message comprises one or more message information elements including the identifier for the user device, and a request to disembark;
transmit a transportation complete acknowledgement message to the user device, via the wireless transceiver, the transportation complete acknowledgement message comprises one or more message information elements including an estimate of arrival to destination and a confirmation of the request to disembark.

62. The transportation entity of clause 61, wherein the at least one processor is further configured to:
transmit a transportation complete response message to the user device, via the wireless transceiver, the transportation complete response message comprises one or more message information elements including the identifier for the user device, an ingress location, and an egress location.

63. The transportation entity of clause 62, wherein the transportation complete response message further comprises one or more message information elements including at least one of a fare and a request to provide periodic signals to validate that the user device has exited the transport vehicle.

64. The transportation entity of any of clauses 50-63, wherein the transportation entity comprises a transport vehicle, a transport server, or both.

65. A transportation entity configured to perform information exchange for a transportation service, the transportation entity comprising:
means for receiving a transportation request message from a user device wirelessly, the transportation request message comprises one or more message information elements including an identifier for the user device, and a requested destination;
means for transmitting a transportation response message to the user device wirelessly, the transportation response message comprises one or more message information elements including an acceptance or rejection of the transportation request message; and
means for receiving a transportation confirm message from the user device wirelessly in response to an acceptance in the transportation response message, the transportation confirm message comprises one or more message information elements including the identifier for the user device.

66. A non-transitory storage medium including program code stored thereon, the program code is operable to configure at least one processor in a transportation entity to perform information exchange for a transportation service, the non-transitory storage medium comprising:
program code to receive a transportation request message from a user device wirelessly, the transportation request message comprises one or more message information elements including an identifier for the user device, and a requested destination;
program code to transmit a transportation response message to the user device wirelessly, the transportation response message comprises one or more message information elements including an acceptance or rejection of the transportation request message; and
program code to receive a transportation confirm message from the user device wirelessly in response to an acceptance in the transportation response message, the transportation confirm message comprises one or more message information elements including the identifier for the user device.

Therefore, it is intended that claimed subject matter not be limited to the particular examples disclosed, but that such claimed subject matter may also include all aspects falling within the scope of appended claims, and equivalents thereof.

What is claimed is:

1. A method of wireless communication at a user device, comprising:
broadcasting a transportation request message to a transportation entity wirelessly, wherein the transportation request message comprises a first set of message information elements including an identifier for the user device and a requested destination;
receiving a transportation response message broadcasted by the transportation entity wirelessly, wherein the transportation response message comprises a second set of message information elements including acceptance or rejection of the transportation request message;
transmitting a transportation confirm message to the transportation entity wirelessly in response to the acceptance in the transportation response message, wherein the transportation confirm message comprises a third set of message information elements including the identifier for the user device;
broadcasting a transportation status request message to the transportation entity wirelessly, wherein the transportation status request message comprises a fourth set of message information elements including a query for information related to a current location; and receiving a transportation status message broadcasted by the transportation entity wirelessly, wherein the transportation status message comprises a fifth set of message information elements including information related to the current location.

2. The method of claim 1, wherein the first set of message information elements in the transportation request message further comprises at least one of a type of transport device requested, a number of users, a validity time for the transportation request message, a maximum travel time or required destination arrival time, or a combination thereof.

3. The method of claim 1, further comprising determining an estimate of arrival to the requested destination using the information related to the current location.

4. The method of claim 1, wherein the fourth set of message information elements in the transportation status request message further includes the identifier for the user device, a query for information related to an estimate of arrival to the requested destination, and wherein the fifth set of message information elements in the transportation status message further includes the estimate of arrival to destination.

5. The method of claim 4, wherein the estimate of arrival to destination comprises one or more of estimated time of arrival to destination and estimated number of stops to destination, and wherein the fifth set of message information elements in the transportation status message further includes a destination of a transport vehicle nearest the requested destination.

6. The method of claim 1, further comprising:
broadcasting a transportation complete request message to the transportation entity wirelessly, wherein the transportation complete request message comprises a sixth set of message information elements including the identifier for the user device, and a request to disembark;

receiving a transportation complete acknowledgement message broadcasted by the transportation entity wirelessly, wherein the transportation complete acknowledgement message comprises a seventh set of message information elements including an estimate of arrival to destination and a confirmation of the request to disembark; and receiving a transportation complete response message broadcasted by the transportation entity wirelessly, wherein the transportation complete response message comprises an eighth set of message information elements including the identifier for the user device, and including at least one of an ingress location, an egress location, a fare and a request to provide periodic signals to validate that the user device has exited a transport vehicle.

7. The method of claim 1, further comprising:
transmitting a transport registration message to the transportation entity, wherein the transport registration message includes a payment method to be charged for transport; and receiving a first acknowledgement message for the transportation registration message from the transportation entity based on the transport registration message, wherein the transportation request message is broadcasted to the transportation entity based on the first acknowledgement message.

8. The method of claim 7, further comprising:
transmitting a deregistration message to the transportation entity, wherein the deregistration message completes a purchase based on the payment method.

9. An apparatus for wireless communication at a user device, comprising:
a memory; and
at least one processor coupled to the memory and configured to:
broadcast a transportation request message to a transportation entity wirelessly, wherein the transportation request message comprises a first set of message information elements including an identifier for the user device and a requested destination;
receive a transportation response message broadcasted by the transportation entity wirelessly, wherein the transportation response message comprises a second set of message information elements including acceptance or rejection of the transportation request message;
transmit a transportation confirm message to the transportation entity wirelessly in response to the acceptance in the transportation response message, wherein the transportation confirm message comprises a third set of message information elements including the identifier for the user device;
broadcast a transportation status request message to the transportation entity wirelessly, wherein the transportation status request message comprises a fourth set of message information elements including a query for information related to a current location; and
receive a transportation status message broadcasted by the transportation entity wirelessly, wherein the transportation status message comprises a fifth set of message information elements including information related to the current location.

10. The apparatus of claim 9, wherein the first set of message information elements in the transportation request message further comprises at least one of a type of transport device requested, a number of users, a validity time for the transportation request message, a maximum travel time or required destination arrival time, or a combination thereof.

11. The apparatus of claim 9, wherein the fourth set of message information elements in the transportation status request message further includes the identifier for the user device, a query for information related to an estimate of arrival to the requested destination, and wherein the fifth set of message information elements in the transportation status message further includes the estimate of arrival to destination.

12. The apparatus of claim 11, wherein the estimate of arrival to destination comprises one or more of estimated time of arrival to destination and estimated number of stops to destination, and wherein the fifth set of message information elements in the transportation status message further includes a destination of a transport vehicle nearest the requested destination.

13. The apparatus of claim 9, wherein the at least one processor is further configured to:
transmit a transport registration message to the transportation entity, wherein the transport registration message includes a payment method to be charged for transport; and
receive a first acknowledgement message for the transportation registration message from the transportation entity based on the transport registration message, wherein the transportation request message is broadcasted to the transportation entity based on the first acknowledgement message.

14. The apparatus of claim 13, wherein the at least one processor is further configured to:
transmit a deregistration message to the transportation entity, wherein the deregistration message completes a purchase based on the payment method.

15. The apparatus of claim 9, wherein the at least one processor is further configured to:
broadcast a transportation complete request message to the transportation entity wirelessly, wherein the transportation complete request message comprises a sixth set of message information elements including the identifier for the user device, and a request to disembark;
receive a transportation complete acknowledgement message broadcasted by the transportation entity wirelessly, wherein the transportation complete acknowledgement message comprises a seventh set of message information elements including an estimate of arrival to destination and a confirmation of the request to disembark; and
receive a transportation complete response message broadcasted by the transportation entity wirelessly, wherein the transportation complete response message comprises an eighth set of message information elements including the identifier for the user device, and including at least one of an ingress location, an egress location, a fare and a request to provide periodic signals to validate that the user device has exited a transport vehicle.

16. A method of wireless communication at a transportation entity, comprising:
receiving a transportation request message broadcasted by a user device wirelessly, wherein the transportation request message comprises a first set of message information elements including an identifier for the user device and a requested destination;
broadcasting a transportation response message to the user device wirelessly, wherein the transportation response message comprises a second set of message information elements including acceptance or rejection of the transportation request message;
receiving a transportation confirm message from the user device wirelessly in response to the acceptance in the transportation response message, wherein the transportation confirm message comprises a third set of message information elements including the identifier for the user device;
receiving a transportation status request message broadcasted by the user device wirelessly, wherein the transportation status request message comprises a fourth set of message information elements including a query for information related to a current location; and
broadcasting a transportation status message to the user device wirelessly, wherein the transportation status message comprises a fifth set of message information elements including information related to the current location.

17. The method of claim 16, wherein the first set of message information elements in the transportation request message further comprises at least one of a type of transport device requested, a number of users, a validity time for the transportation request message, a maximum travel time or required destination arrival time, or a combination thereof.

18. The method of claim 16, wherein the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

19. The method of claim 16, wherein the fourth set of message information elements in the transportation status request message further includes the identifier for the user device, a query for information related to an estimate of arrival to the requested destination, and
wherein the fifth set of message information elements in the transportation status message further includes the estimate of arrival to destination.

20. The method of claim 19, wherein the estimate of arrival to destination comprises one or more of estimated time of arrival to destination and estimated number of stops to destination.

21. The method of claim 19, wherein the fifth set of message information elements in the transportation status message further includes a destination of a transport vehicle nearest the requested destination.

22. The method of claim 16, further comprising:
receiving a transportation complete request message broadcasted by the user device wirelessly, wherein the transportation complete request message comprises a sixth set of message information elements including the identifier for the user device, and a request to disembark; and
broadcasting a transportation complete acknowledgement message to the user device wirelessly, wherein the transportation complete acknowledgement message comprises a seventh set of message information elements including an estimate of arrival to destination and a confirmation of the request to disembark.

23. The method of claim 22, further comprising:
broadcasting a transportation complete response message to the user device wirelessly, wherein the transportation complete response message comprises an eighth set of message information elements including the identifier for the user device, and including at least one of an ingress location, an egress location, a fare and a request to provide periodic signals to validate that the user device has exited a transport vehicle.

24. An apparatus for wireless communication at a transportation entity, comprising:
a memory; and
at least one processor coupled to the memory and configured to:
receive a transportation request message broadcasted by a user device wirelessly, wherein the transportation request message comprises a first set of message information elements including an identifier for the user device and a requested destination;
broadcast a transportation response message to the user device wirelessly, wherein the transportation response message comprises a second set of message information elements including acceptance or rejection of the transportation request message;
receive a transportation confirm message from the user device wirelessly in response to the acceptance in the transportation response message, wherein the transportation confirm message comprises a third set of message information elements including the identifier for the user device;
receive a transportation status request message broadcasted by the user device wirelessly, wherein the transportation status request message comprises a fourth set of message information elements including a query for information related to a current location; and broadcast a transportation status message to the user device wirelessly, wherein the transportation status message comprises a fifth set of message information elements including information related to the current location.

25. The apparatus of claim 24, wherein the first set of message information elements in the transportation request message further comprises at least one of a type of transport device requested, a number of users, a validity time for the transportation request message, a maximum travel time or required destination arrival time, or a combination thereof.

26. The apparatus of claim 24, wherein the transportation request message, the transportation response message, and the transportation confirm message are dedicated messages in a Device-to-Device (D2D) communication link, comprising one or more of a dedicated short-range communication (DSRC), a cellular Vehicle-to-Everything (C-V2X) communication, or a 5G New Radio (NR) communication.

27. The apparatus of claim 24, wherein the fourth set of message information elements in the transportation status request message further includes the identifier for the user device, a query for information related to an estimate of arrival to the requested destination, and wherein the fifth set of message information elements in the transportation status message further includes the estimate of arrival to destination.

28. The apparatus of claim 27, wherein the estimate of arrival to destination comprises one or more of estimated time of arrival to destination and estimated number of stops to destination.

29. The apparatus of claim 27, wherein the fifth set of message information elements in the transportation status message further includes a destination of a transport vehicle nearest the requested destination.

30. The apparatus of claim 24, wherein the at least one processor is further configured to:

receive a transportation complete request message broadcasted by the user device wirelessly, wherein the transportation complete request message comprises a sixth set of message information elements including the identifier for the user device, and a request to disembark;

broadcast a transportation complete acknowledgement message to the user device wirelessly, wherein the transportation complete acknowledgement message comprises a seventh set of message information elements including an estimate of arrival to destination and a confirmation of the request to disembark; and broadcast a transportation complete response message to the user device wirelessly, wherein the transportation complete response message comprises an eighth set of message information elements including the identifier for the user device, and including at least one of an ingress location, an egress location, a fare and a request to provide periodic signals to validate that the user device has exited a transport vehicle.

* * * * *